(12) United States Patent
Lu et al.

(10) Patent No.: US 12,131,436 B2
(45) Date of Patent: Oct. 29, 2024

(54) TARGET IMAGE GENERATION METHOD AND APPARATUS, SERVER, AND STORAGE MEDIUM

(71) Applicant: TENCENT TECHNOLOGY (SHENZHEN) COMPANY LIMITED, Shenzhen (CN)

(72) Inventors: Liying Lu, Shenzhen (CN); Shu Liu, Shenzhen (CN); Jiaya Jia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 423 days.

(21) Appl. No.: 17/534,370

(22) Filed: Nov. 23, 2021

(65) Prior Publication Data
US 2022/0084163 A1 Mar. 17, 2022

Related U.S. Application Data

(63) Continuation of application No. PCT/CN2020/115678, filed on Sep. 16, 2020.

(30) Foreign Application Priority Data

Sep. 17, 2019 (CN) .......................... 201910875771.8

(51) Int. Cl.
*G06T 3/18* (2024.01)
*G06T 3/40* (2006.01)
*G06T 7/70* (2017.01)

(52) U.S. Cl.
CPC ............. *G06T 3/18* (2024.01); *G06T 3/40* (2013.01); *G06T 7/70* (2017.01);
(Continued)

(58) Field of Classification Search
None
See application file for complete search history.

(56) References Cited

U.S. PATENT DOCUMENTS 8,406,519 B1 * 3/2013 Lim ...................... G06T 11/00
382/170
2019/0371080 A1 * 12/2019 Sminchisescu ......... G06T 17/20
(Continued)

FOREIGN PATENT DOCUMENTS

| CN | 104700076 A | 6/2015 |
| CN | 108564119 A | 9/2018 |

(Continued)

OTHER PUBLICATIONS

Song, S.—"Unsupervised Person Image Generation with Semantic Parsing Transformation"—arXiv—Apr. 2019—pp. 1-10 (Year: 2019).*
(Continued)

*Primary Examiner* — Bernard Krasnic
(74) *Attorney, Agent, or Firm* — ANOVA LAW GROUP, PLLC

(57) ABSTRACT

The present disclosure provides a target image generation method. The method includes obtaining a first parsed image and a first pose image based on an original image, the first parsed image being an image labeled with parts of an object in the original image, the first pose image representing a pose of the object in the original image; inputting the first parsed image, the first pose image, and a second pose image representing a target pose into a first image generation model, and determining, a first transformation parameter and adjusting the first parsed image based on the first transformation parameter to obtain a target parsed image, a pose of the object in the target parsed image being the target pose; and inputting a first combined image and a second combined image into a second image generation model, and adjusting the first combined image to obtain a target image.

20 Claims, 11 Drawing Sheets

(52) U.S. Cl.
CPC ............... *G06T 2207/20081* (2013.01); *G06T 2207/20084* (2013.01); *G06T 2207/30196* (2013.01)

(56) References Cited

U.S. PATENT DOCUMENTS

2021/0004984 A1\* 1/2021 Ji .............................. G06T 7/11
2021/0243383 A1 8/2021 Huang et al.

FOREIGN PATENT DOCUMENTS

| CN | 109951654 A | 6/2019 |
| CN | 110189248 A | 8/2019 |

OTHER PUBLICATIONS

Balakrishnan, G.—"Synthesizing Images of Humans in Unseen Poses"—arXiv—Apr. 2018—pp. 1-9 (Year: 2018).\*

The World Intellectual Property Organization (WIPO) International Search Report for PCT/CN2020/115678 Dec. 21, 2020 6 Pages (including translation).

Yining Li et al., "Dense Intrinsic Appearance Flow for Human Pose Transfer," 2019 IEEE/CVF Conference on computer Vision and Pattern Recognition (CVPR), Jun. 20, 2019 (Jun. 20, 2019). 10 pages.

\* cited by examiner

A server obtains a first sample analysis image and a first sample pose image based on a first sample image, the first sample image being any sample image in a plurality of sample images obtained by the server, the first sample parsed image being an image labeled with parts of an object in the first sample image, the first sample pose image being used for representing a pose of the object in the first sample image — 201

The server obtains a second sample parsed image and a second sample pose image based on a second sample image, the second sample image being a target image including the same object as the first sample image, the second sample parsed image being an image labeled with parts of an object in the second sample image, the second sample pose image being used for representing a pose of the object in the second sample image — 202

The server inputs the first sample parsed image, the first sample pose image, and the second sample pose image into a to-be-trained first model, the first model outputting a third sample parsed image — 203

The server performs consistency detection on the second sample parsed image and the third sample parsed image, and adjusts a first training parameter of the first model according to a detection result until a first image generation model is obtained — 204

FIG. 2

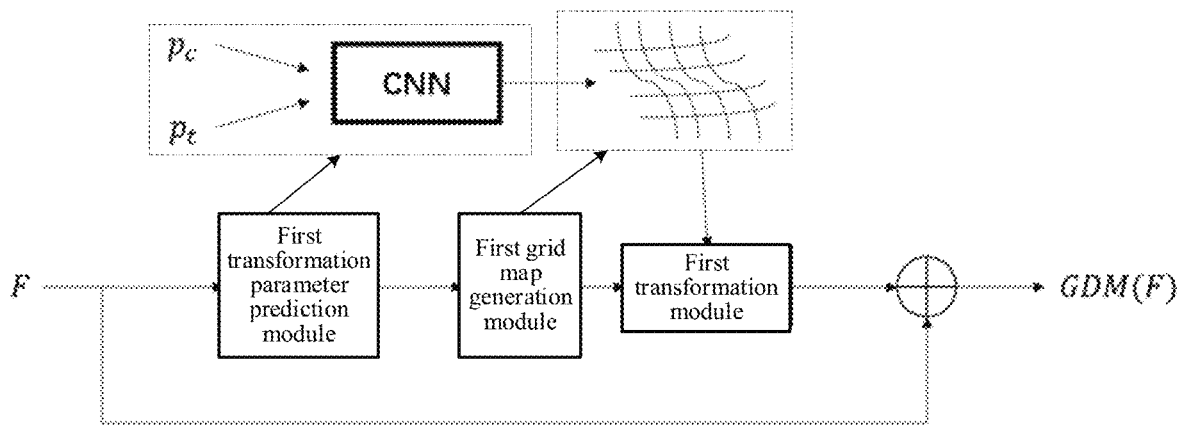

FIG. 3

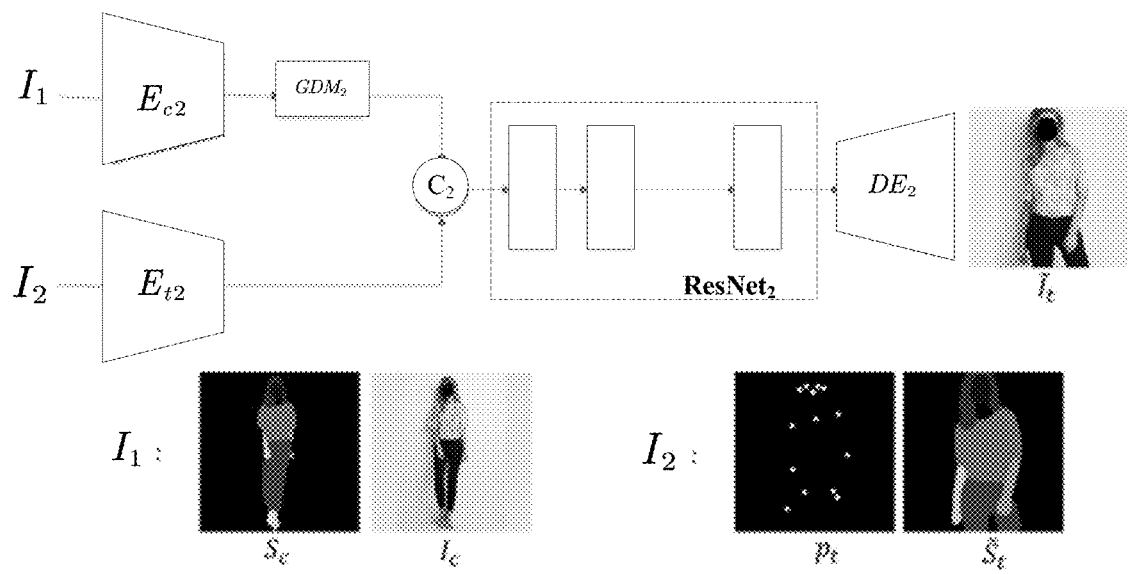
FIG. 8
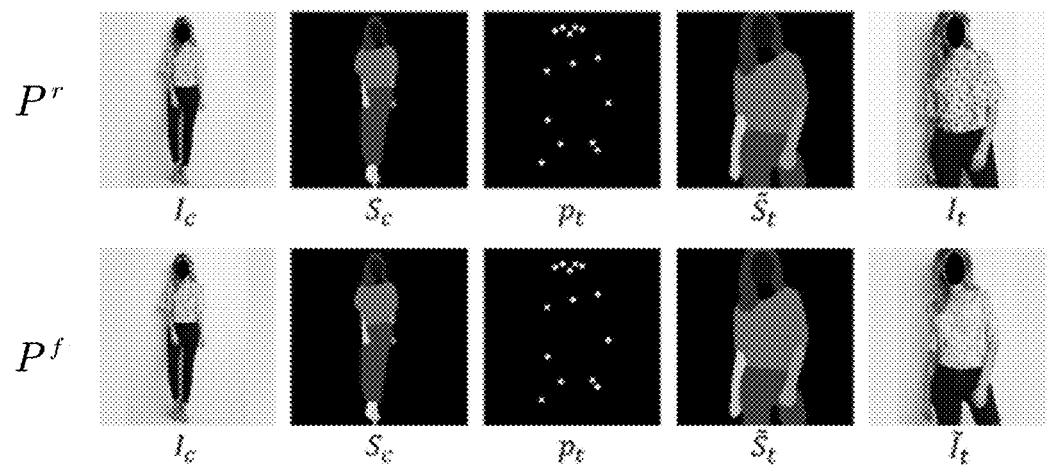
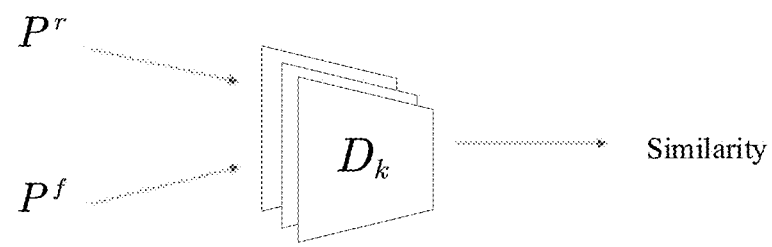
FIG. 9

# TARGET IMAGE GENERATION METHOD AND APPARATUS, SERVER, AND STORAGE MEDIUM

RELATED APPLICATIONS

This application claims priority to PCT Application No. PCT/CN2020/115678, filed on Sep. 16, 2020, which in turn claims priority to Chinese Patent Application No. 201910875771.8, filed with the National Intellectual Property Administration, PRC on Sep. 17, 2019, and entitled "TARGET IMAGE GENERATION METHOD AND APPARATUS, SERVER, AND STORAGE MEDIUM." The two applications are incorporated herein by reference in their entirety.

FIELD OF THE TECHNOLOGY

This application relates to the field of image processing technologies, and in particular, to a target image generation method and apparatus, a human pose transformation method and apparatus, a server, and a storage medium.

BACKGROUND OF THE DISCLOSURE

In the field of image processing technologies, a human pose transfer technology is a very hot topic. In summary, human pose transfer (HPT) is based on a picture including a character and a target pose, transform the character in the picture into the appearance of the target pose. The HPT can change a pose of a character not only in pictures, but also in videos. For example, given a video of a professional dancer as a target video and a video of an amateur dancer, the movements of the amateur dancer can be made the same as those of the professional dancer through HPT.

In the related art, an image including a character and a target pose image may be directly inputted into a generative adversarial network (GAN, which is a deep learning model) when the pose transfer of the character in the image is carried out, and the GAN network outputs an image after pose transfer. However, when the human pose changes greatly before and after the transfer, and the background of some images is relatively complex, spatial misalignment appears before and after the transfer when large pose transfer of the character is carried out by using the GAN network. In addition, texture information of a generated image lacks a high frequency part, resulting in problems such as unclear image details.

SUMMARY

Embodiments of this application provide a target image generation method and apparatus, a human pose transformation method and apparatus, a server, and a storage medium, to improve the quality of a generated image. The technical solutions are as follows.

One aspect of the present disclosure provides a target image generation method. The method includes obtaining a first parsed image and a first pose image based on an original image, the first parsed image being an image labeled with parts of an object in the original image, the first pose image representing a pose of the object in the original image; inputting the first parsed image, the first pose image, and a second pose image representing a target pose into a first image generation model, and determining, by the first image generation model, a first transformation parameter and adjusting the first parsed image based on the first transformation parameter to obtain a target parsed image, a pose of the object in the target parsed image being the target pose, the first transformation parameter being a transformation parameter for transforming from the first pose image to the second pose image; combining the original image and the first parsed image to obtain a first combined image; combining the second pose image and the target parsed image to obtain a second combined image; and inputting the first combined image and the second combined image into a second image generation model, and determining, by the second image generation model, a second transformation parameter and adjusting the first combined image based on the second transformation parameter and the second combined image to obtain a target image, a pose of the object in the target image being the target pose, the second transformation parameter being a transformation parameter for transforming from the first parsed image to the target parsed image.

Another aspect of the present disclosure provides a human pose image transformation method. The method includes obtaining a second parsed image and a third pose image based on a first human body image, the second parsed image being an image labeled with parts of a human body in the first human body image, the third pose image representing a pose of the human body in the first human body image; determining a third transformation parameter, and adjusting the second parsed image based on the third transformation parameter to obtain a third parsed image, a pose of a human body in the third parsed image being a target human pose, the third transformation parameter being a transformation parameter for transforming from the third pose image to a fourth pose image representing the target human pose; combining the first human body image and the second parsed image to obtain a third combined image; combining the fourth pose image and the third parsed image to obtain a fourth combined image; and determining a fourth transformation parameter, and adjusting the third combined image based on the fourth transformation parameter and the fourth combined image to obtain a second human body image, a pose of a human body in the second human body image being the target human pose, the fourth transformation parameter being a transformation parameter for transforming from the second parsed image to the third parsed image.

Another aspect of the present disclosure provides a target image generation apparatus. The apparatus includes a first image obtaining module, configured to obtain a first parsed image and a first pose image based on an original image, the first parsed image being an image labeled with parts of an object in the original image, the first pose image representing a pose of the object in the original image; a first image transformation module, configured to input the first parsed image, the first pose image, and a second pose image representing a target pose into a first image generation model, the first image generation model determining a first transformation parameter and adjusting the first parsed image based on the first transformation parameter to obtain a target parsed image, a pose of an object in the target parsed image being the target pose, the first transformation parameter being a transformation parameter for transforming from the first pose image to the second pose image; and a first image combination module, configured to: combine the original image and the first parsed image to obtain a first combined image; and combine the second pose image and the target parsed image to obtain a second combined image, the first image transformation module being further configured to input the first combined image and the second combined image into a second image generation model, the second image generation model determining a second transformation parameter and adjusting the first combined image based on the second transformation parameter and the second combined image to obtain a target image, a pose of an object in the target image being the target pose, the second transformation parameter being a transformation parameter for transforming from the first parsed image to the target parsed image.

Another aspect of the present disclosure provides a server, including a processor and a memory, the memory being configured to store program code, and the processor being configured to run the program code in the memory to perform obtaining a first parsed image and a first pose image based on an original image, the first parsed image being an image labeled with parts of an object in the original image, the first pose image representing a pose of the object in the original image; inputting the first parsed image, the first pose image, and a second pose image representing a target pose into a first image generation model, and determining, by the first image generation model, a first transformation parameter and adjusting the first parsed image based on the first transformation parameter to obtain a target parsed image, a pose of an object in the target parsed image being the target pose, the first transformation parameter being a transformation parameter for transforming from the first pose image to the second pose image; combining the original image and the first parsed image to obtain a first combined image; combining the second pose image and the target parsed image to obtain a second combined image; and inputting the first combined image and the second combined image into a second image generation model, and determining, by the second image generation model, a second transformation parameter and adjusting the first combined image based on the second transformation parameter and the second combined image to obtain a target image, a pose of an object in the target image being the target pose, the second transformation parameter being a transformation parameter for transforming from the first parsed image to the target parsed image.

Another aspect of the present disclosure provides a non-transitory storage medium, storing program code. The program code, when run by a processor, causes the processor to perform the following operations: obtaining a first parsed image and a first pose image based on an original image, the first parsed image being an image labeled with parts of an object in the original image, the first pose image representing a pose of the object in the original image; inputting the first parsed image, the first pose image, and a second pose image representing a target pose into a first image generation model, and determining, by the first image generation model, a first transformation parameter and adjusting the first parsed image based on the first transformation parameter to obtain a target parsed image, a pose of an object in the target parsed image being the target pose, the first transformation parameter being a transformation parameter for transforming from the first pose image to the second pose image; combining the original image and the first parsed image to obtain a first combined image; combining the second pose image and the target parsed image to obtain a second combined image; and inputting the first combined image and the second combined image into a second image generation model, and determining, by the second image generation model, a second transformation parameter and adjusting the first combined image based on the second transformation parameter and the second combined image to obtain a target image, a pose of an object in the target image being the target pose, the second transformation parameter being a transformation parameter for transforming from the first parsed image to the target parsed image.

In embodiments consistent with the present disclosure a first image generation model determines a first transformation parameter, and adjusts a first parsed image based on the first transformation parameter, so that a pose in the first parsed image and a pose in a generated target parsed image are aligned. A second image generation model determines a second transformation parameter according to the target parsed image obtained by the first image generation model, and adjusts a combined original image and the first parsed image based on the second transformation parameter, so that pixels in the original image and pixels in a generated target image are aligned, and better image details are achieved. Because the poses in the parsed images before and after the transformation are aligned, images before and after the transformation can be kept in spatial alignment, so that the final generated target image can ensure both spatial alignment and clear details.

BRIEF DESCRIPTION OF THE DRAWINGS

To describe technical solutions in embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings from the accompanying drawings without creative efforts.

FIG. 2 is a flowchart of a method for training a first image generation model according to an embodiment of this application.

FIG. 3 is a schematic structural diagram of a first geometric deformation module according to an embodiment of this application.

FIG. 8 is a schematic structural diagram of a second model according to an embodiment of this application.

FIG. 9 is a schematic structural diagram of a multiscale discriminator according to an embodiment of this application.

DESCRIPTION OF EMBODIMENTS

Figure 1:
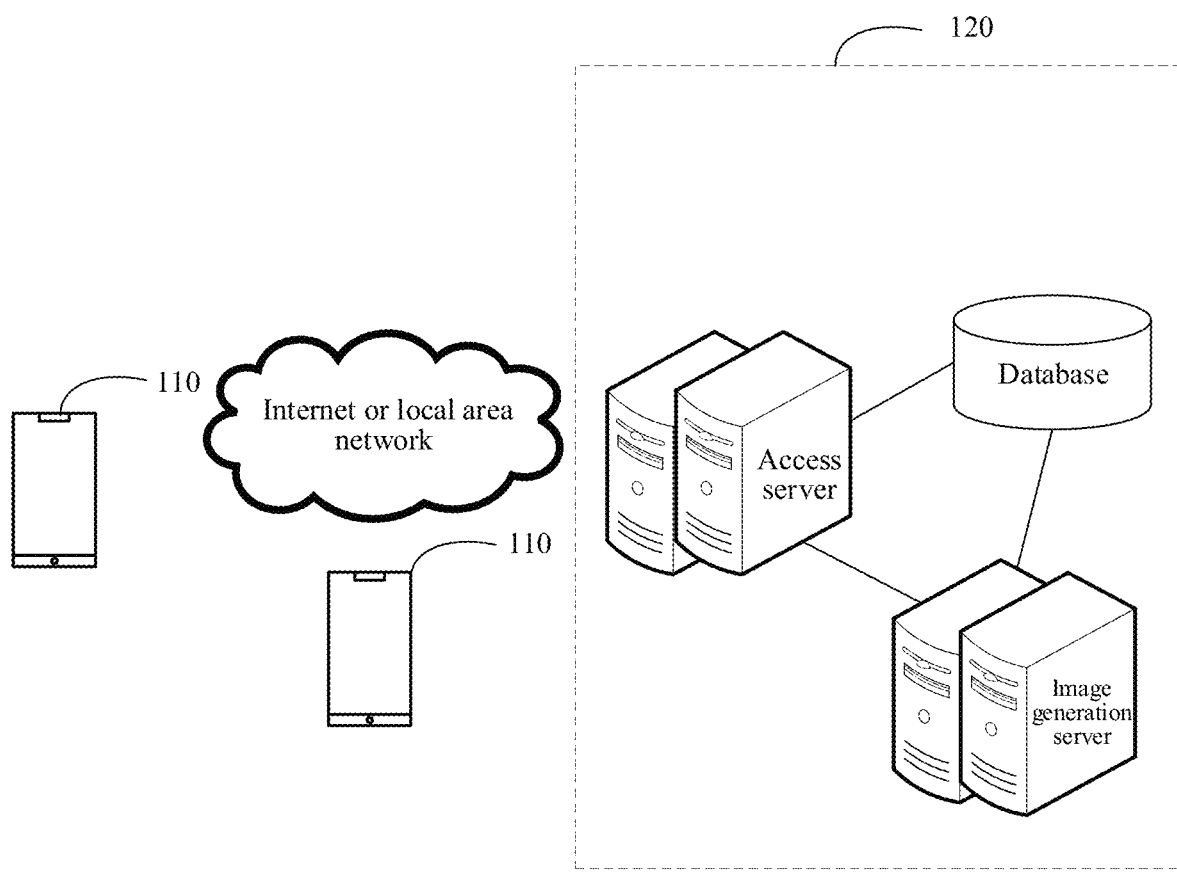
FIG. 1 is a schematic diagram of an implementation environment of a target image generation method according to an embodiment of this application.

To make objectives, technical solutions, and advantages of this application clearer, the following further describes implementations of this application in detail with reference to the accompanying drawings.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with this application. On the contrary, the implementations are merely examples of apparatuses and methods that are described in detail in the appended claims and that are consistent with some aspects of this application.

The embodiments of this application mainly relate to a scenario in which a target image is generated. For example, the related scenario is that: transforming an object in a given image from a current image to a given pose, to obtain an image including the given pose of the object. In some embodiments, the object may be a character, an animal, a plant, or the like. For example, a side-body image of a character A and a front-body image of a character B are given at the same time, applying the technical solutions provided in this application, the character A can transform from a sideway pose to a front view pose based on the front-body image of the character B, to generate a front-body image of the character A.

In the embodiments of this application, based on an image including a target pose, a pose of an object in an original image can be transformed, to generate a target image including the target pose of the object. In some embodiments, a process of generating a target image includes two stages. The first stage is implemented by using a first image generation model. That is, a first parsed image labeled with a part of an object in the original image original image, a first pose image including a pose of the object in the original image, and a second pose image including a target pose, are inputted into the first image generation model to generate a target parsed image in which a combination of the parts of the object corresponds to the target pose. The second stage is implemented by using a second image generation model. That is, the original image and the first parsed image are combined, the first pose image and the target parsed image are combined, and the combined images are inputted into the second image generation model to generate a target image including the target pose of the object.

This application belongs to the field of image processing technologies, and relates to technologies of computer vision (CV) during image processing. The CV technology is briefly described below. The CV is a science that studies how to use a machine to "see", and furthermore, that uses a camera and a computer to replace human eyes and brains to implement functions such as recognition, tracking, and measurement on a target, and further perform graphic processing by using the computer, to process an image photographed by the camera into an image more suitable for human eyes to observe or an instrument to detect. As a scientific subject, the CV studies related theories and technologies and attempts to establish an artificial intelligence (AI) system that can obtain information from images or multidimensional data. The CV technologies generally include technologies such as image processing, image recognition, image semantic understanding (ISU), image retrieval, optical character recognition (OCR), video processing, video semantic understanding, video content/behavior recognition, three-dimensional object reconstruction, a three-dimensional (3D) technology, virtual reality, augmented reality, synchronous positioning, and map construction, and further include biological feature recognition technologies such as common face recognition and fingerprint recognition.

FIG. 1 is a schematic diagram of an implementation environment of a target image generation method according to an embodiment of this application. Referring to FIG. 1, the implementation environment includes a terminal 110 and a server 120.

In some embodiments, the terminal 110 is connected to the server 120 by using a wireless network or a wired network. The terminal 110 may be at least one of a smartphone, a camera, a desktop computer, a tablet computer, and a laptop portable computer. An application program supporting an image processing function is installed and run on the terminal 110. In some embodiments, the application program is a social application program, an image processing application program, a video processing application program, or the like. For example, the terminal 110 is a terminal used by a user, and the application program running on the terminal 110 logs in to a user account.

The server 120 includes at least one of one server, a plurality of servers, and a cloud computing platform. The server 120 is configured to provide a backend service for generating a target image. In some embodiments, the server 120 is responsible for primary work for generating a target image, and the terminal 110 is responsible for secondary work for generating the target image; or the server 120 is responsible for secondary work for generating a target image, and the terminal 110 is responsible for primary work for generating the target image; or the server 120 and the terminal 110 are separately responsible for work for generating a target image independently.

In some embodiments, the server 120 includes: an access server, an image generation server, and a database. The access server is configured to provide an access service of the terminal 110. The image generation server is configured to generate a target image including an object of a target pose according to an original image and a target pose image uploaded by a user. In some embodiments, there may be one or more image generation servers, and when there are a plurality of image generation servers, at least two image generation servers are configured to provide different services, and/or at least two image generation servers are configured to provide the same service, for example, provide the same service by using a load balancing manner or provide the same service in a manner of a master server and a mirror server. This is not limited in one embodiment. The database is configured to store the original image and the target pose image uploaded by the user, and the generated target image. Information stored in the database is information authorized by the user for use.

In some embodiments, the terminal 110 generally refers to one of a plurality of terminals. In this embodiment, the terminal 110 is merely used as an example for description. A person skilled in the art may learn that there may be more or fewer terminals. For example, there may be only one terminal 110, or there may be dozens of or hundreds of or more terminals. In this case, another terminal may be further included in the foregoing application environment. The quantity and the type of the terminals are not limited in the embodiments of the present disclosure.

In one embodiment, target images are generated by using a first image generation model and a second image generation model. To describe the technical solutions provided in this application more clearly, methods for training the first image generation model and the second image generation model provided in this application are described first. Referring to FIG. 2, a method for training a first image generation model is provided, and the method includes the following steps:

201: A server obtains a first sample parsed image and a first sample pose image based on a first sample image, the first sample image being any sample image in a plurality of sample images obtained by the server, the first sample parsed image being an image labeled with parts of an object in the first sample image, the first sample pose image being used for representing a pose of the object in the first sample image. For example, the first sample image is a front-body image of a male, and the male's feet are put together and arms are straight up.

202: The server obtains a second sample parsed image and a second sample pose image based on a second sample image, the second sample image being a target image including the same object as the first sample image, the second sample parsed image being an image labeled with parts of an object in the second sample image, the second sample pose image being used for representing a pose of the object in the second sample image.

If the object in the second sample image is the male in the first sample image, in the second sample image, the male's legs are separated by 30 degrees and arms are extended horizontally on two sides of a body. That is, the first sample image and the second sample image are different in the poses of the male. In some embodiments, the user regards, by using the server, the pose represented in the second sample image as the target pose, or regards the pose represented in the first sample image as the target pose. This is not specifically limited in one embodiment. If the target pose is the pose represented in the second sample image, a process of training the first image generation model is to transform the pose of the object in the first sample image into the pose of the object in the second sample image. If the target pose is the pose represented in the first sample image, a process of training the first image generation model is to transform the pose of the object in the second sample image into the pose of the object in the first sample image. In the following description process, only an example in which the target pose is the pose represented in the second sample image is used for description.

203: The server inputs the first sample parsed image, the first sample pose image, and the second sample pose image into a first model that needs to be trained, the first model outputting a third sample parsed image.

In one embodiment, the first model includes a first encoding module, a second encoding module, a first geometric deformation module, a first combination module, a first residual processing module, and a first decoding module.

The first encoding module is connected to the first geometric deformation module. The first encoding module is configured to encode the first sample parsed image to generate a first sample encoded image. In some embodiments, the first encoding module is constructed by a convolutional neural network, and the first encoding module is an encoder. A quantity of channels of a convolution kernel in the first encoding module is the same as a quantity of channels of the first sample parsed image. For example, if a size of the first sample parsed image is 32*32, and a quantity of channels is 3, where the three channels are respectively R (red), G (green), and B (blue), a quantity of channels of the convolution kernel in the first encoding module is also 3.

The second encoding module is connected to the first combination module. The second encoding module is configured to encode the first sample pose image to generate a second sample encoded image. In some embodiments, the second encoding module and the first encoding module have the same structure.

The first geometric deformation module is connected to the first encoding module and the first combination module. The first geometric deformation module is configured to transform positions of parts of an object in the first sample encoded image in the image to generate a third sample encoded image. FIG. 3 is a schematic structural diagram of a first geometric deformation module according to an embodiment of this application. Referring to FIG. 3, FIG. 3 includes a first sample pose image $P_c$, a second sample pose image $P_t$, an inputted first sample encoded image F, a first transformation parameter prediction module, a first grid map generation module, a first transformation module, and a generated third sample encoded image GDM (F). The first transformation parameter prediction module is configured to determine a first transformation parameter for transforming from $P_c$ to $P_t$ according to the convolutional neural network. The first grid map generation module is configured to generate a first grid map according to the first transformation parameter. The first transformation module is configured to transform the first sample encoded image F according to the first grid map.

The first combination module is connected to the first geometric deformation module, the second encoding module, and the first residual processing module. The first combination module is configured to combine the third sample encoded image and the second sample encoded image into a first sample combined image. In some embodiments, a combination manner is to connect two images on a channel dimension, and a quantity of channels of an obtained image is a sum of quantities of channels of the two images. For example, a size of the second sample encoded image is 32*32, and a quantity of channels is 2, and a size of the third sample encoded image is 32*32, and a quantity of channels is 3. After the two images are connected on the channel dimension, an image with a size of 32*32 and 5 channels is obtained.

The first residual processing module is connected to the first combination module and the first decoding module. The first residual processing module is configured to perform residual processing on a sample combined image to accelerate convergence of the first model.

The first decoding module is connected to the first residual processing module. The first decoding module is configured to decode an image obtained through residual processing to obtain a third sample parsed image.

Figure 4:
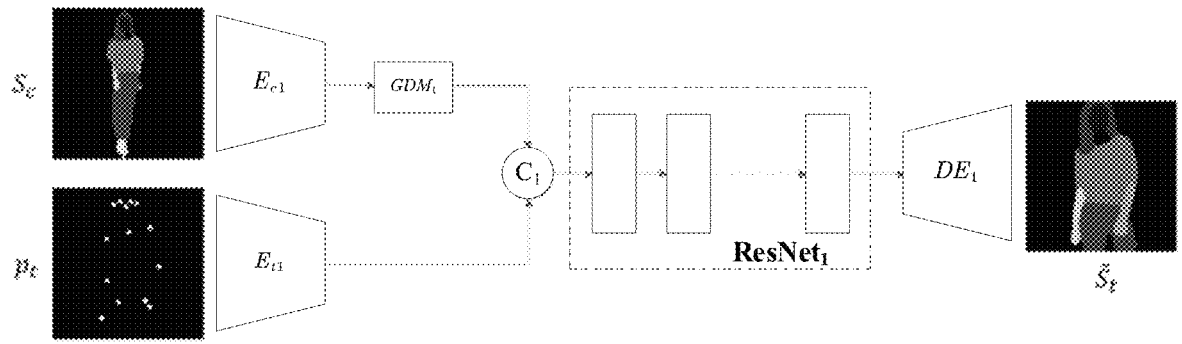
FIG. 4 is a schematic structural diagram of a first model according to an embodiment of this application.

To make the structure of the first model described in this step clearer, FIG. 4 is a schematic structural diagram of a first model according to an embodiment of this application. FIG. 4 includes a first sample parsed image $S_c$, a second sample pose image $P_t$, a first encoding module $E_{c1}$, a second encoding module $E_{t1}$, a first geometric deformation module $GDM_1$, a first combination module $C_1$, a first residual processing module $ResNet_1$, a first decoding module $DE_1$, and a generated third sample parsed image $\tilde{S}_t$. By using the first model provided in this application, after the first sample parsed image $S_c$ and the second sample pose image $P_t$ are inputted into the model, the third sample parsed image $\tilde{S}_t$ after pose transformation may be obtained.

204: The server performs consistency detection on the second sample parsed image and the third sample parsed image, and adjusts a first training parameter of the first model according to a detection result until a first image generation model is obtained.

In one embodiment, the server performs consistency detection on the second sample parsed image and the third sample parsed image by using a first discriminator. For example, the server combines and inputs the second sample pose image $P_t$ and the second sample parsed image $S_t$ into the first discriminator, and combines and inputs the second sample pose image $P_t$ and the third sample parsed image $\tilde{S}_t$ into the first discriminator, so that the first discriminator outputs a similarity between the second sample parsed image and the third sample parsed image, the similarity being used for representing consistency between the second sample pose image $P_t$ and the third sample parsed image $\tilde{S}_t$.

An example in which a result of the consistency detection is the similarity is used, and the server may determine, according to the similarity outputted by the first discriminator, whether to stop training the first model. In any iteration process, when the similarity outputted by the first discriminator is greater than or equal to a first similarity threshold, it indicates that the third sample parsed image generated by the first model and the second sample parsed image are similar enough, the first training parameter of the first model has converged to an appropriate value, and the first model can generate an image that looks like the real image, and therefore the server stops training the first model. When the similarity outputted by the first discriminator is less than the first similarity threshold, it indicates that the third sample parsed image generated by the first model and the second sample parsed image are not similar enough, the first training parameter of the first model does not converge to an appropriate value yet, and the first model cannot generate an image that looks like the real image, and therefore the first model needs to be trained continuously. The server continues to adjust the first training parameter according to the similarity between the third sample parsed image generated by the first model and the second sample parsed image. That is, the server repeatedly performs the foregoing step 201 to step 204, until the similarity outputted by the first discriminator is greater than or equal to the first similarity threshold. In this case, the first model is the first image generation model. In some embodiments, the first similarity threshold is 80%, 85%, 90%, or another value. This is not specifically limited in one embodiment.

Figure 5:
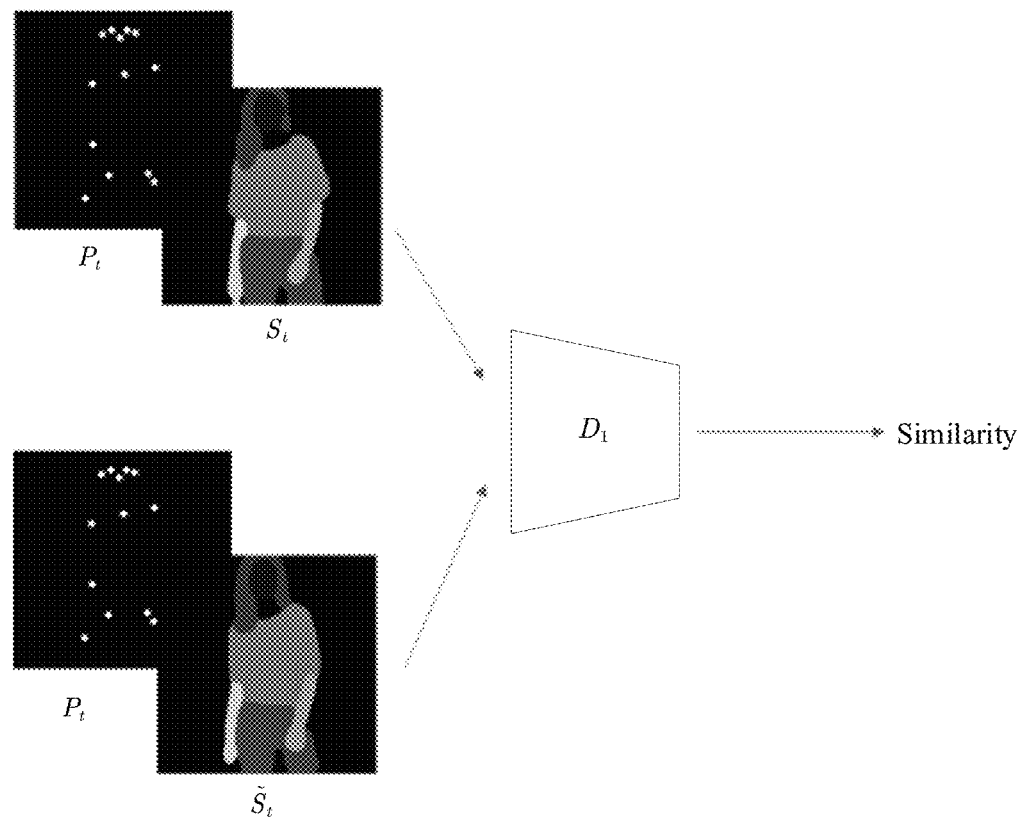
FIG. 5 is a schematic structural diagram of a first discriminator according to an embodiment of this application.

To make the structure of the first discriminator described in step 204 clearer, FIG. 5 is a schematic structural diagram of a first discriminator according to an embodiment of this application. FIG. 5 includes a first sample pose image $P_t$, a second sample parsed image $S_t$, a third sample parsed image $\tilde{S}_t$, and a first discriminator $D_1$.

In some embodiments, the process described in the foregoing step 201 to step 204 can also be represented by using the formula (1):

$$\tilde{S}_t = DE_1(GDM_1(E_{c1}(S_c)), E_{t1}(P_t)), \qquad (1)$$

where $\tilde{S}_t$ represents the third sample parsed image, $DE_1$ represents a first decoding module, $GDM_1$ represents a first geometric deformation module, $E_{c1}$ represents a first encoding module, $S_c$ represents a first sample parsed image, $E_{t1}$ represents a second encoding module, and $P_t$ represents the first sample pose image.

A total loss in the process of training the first image generation model may be represented by using $L_1^{total}$. $L_1^{total}$ includes a cross entropy loss $L_1^{ce}$ and an adversarial loss $L_1^{adv}$, where the cross entropy loss $L_1^{ce}$ is used for optimizing a process of generating the third sample parsed image in step 203, and the adversarial loss $L_1^{adv}$ is used for optimizing the entire training process. In one embodiment, the first image generation model is referred to as a first generator $G_1$.

Correspondingly, the cross entropy loss $L_1^{ce}$ may be obtained by using the formula (2):

$$L_1^{ce} = -\|S_t \otimes \log(\tilde{S}_t)\|_1, \qquad (2)$$

where $L_1^{ce}$ represents a cross entropy loss, $S_t$ represents the second sample parsed image, $\otimes$ represents the multiplication of elements, $\tilde{S}_t$ represents the third sample parsed image, and 1 represents 1-norm.

An adversarial loss $L_{D_1}^{adv}$ of the first discriminator is obtained by using the formula (3):

$$L_{D_1}^{adv} = (D_1(P_t, S_t) - 1)^2 + D_1(P_t, \tilde{S}_t)^2, \qquad (3)$$

where $L_{D_1}^{adv}$ represents the adversarial loss of the first discriminator, $D_1$ represents the first discriminator, $P_t$ represents the first sample pose image, $S_t$ represents the second sample parsed image, and $\tilde{S}_t$ represents the third sample parsed image.

An adversarial loss $L_{G_1}^{adv}$ of the first generator is obtained by using the formula (4):

$$L_{G_1}^{adv} = (D_1(P_t, \tilde{S}_t) - 1)^2, \qquad (4)$$

where $L_{G_1}^{adv}$ represents the adversarial loss of the first generator, $D_1$ represents the first discriminator, $P_t$ represents the first sample pose image, and $\tilde{S}_t$ represents the third sample parsed image.

An adversarial loss $L_1^{adv}$ is obtained by using the formula (5):

$$L_1^{adv} = L_{D_1}^{adv} + L_{G_1}^{adv}, \qquad (5)$$

where $L_1^{adv}$ represents the adversarial loss, $L_{D_1}^{adv}$ represents the adversarial loss of the first discriminator, and $L_{G_1}^{adv}$ represents the adversarial loss of the first generator.

A total adversarial loss $L_1^{total}$ is obtained by using the formula (6):

$$L_1^{total} = L_1^{adv} + \lambda L_1^{ce}, \qquad (6)$$

where $L_1^{total}$ represents the total loss, $L_1^{adv}$ represents the adversarial loss, $L_1^{ce}$ represents the cross entropy loss, and λ represents a weighting coefficient of the cross entropy loss.

Figure 6:
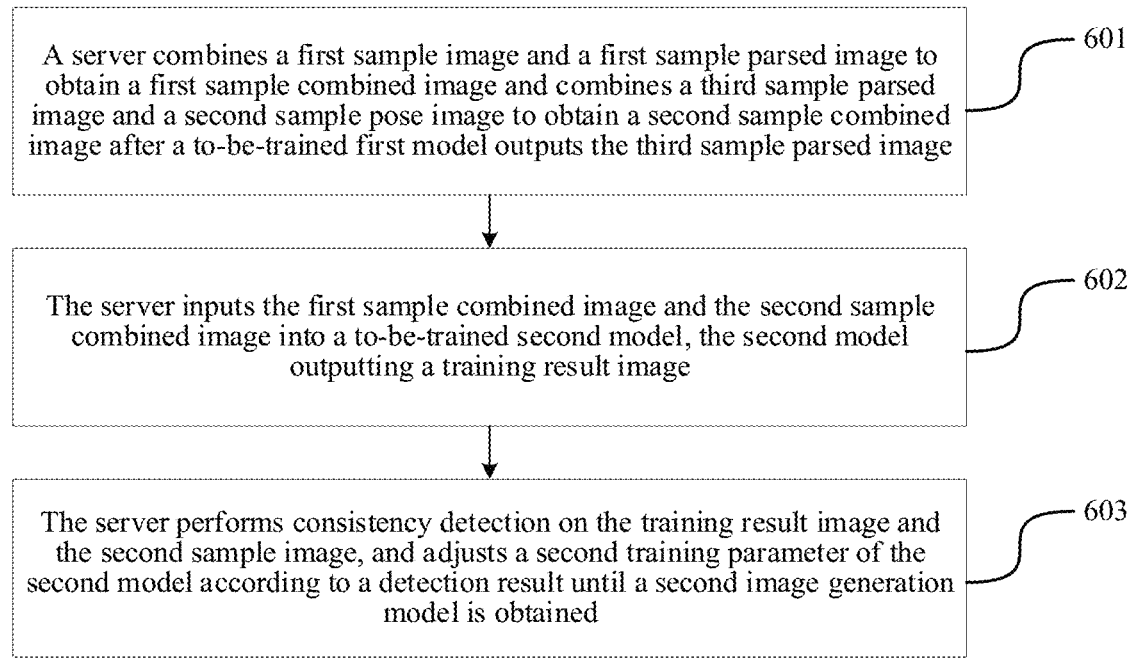
FIG. 6 is a flowchart of a method for training a second image generation model according to an embodiment of this application.

FIG. 6 provides a method for training the second image generation model, and the method includes the following steps:

601: A server combines a first sample image and a first sample parsed image to obtain a first sample combined image and combines a third sample parsed image and a second sample pose image to obtain a second sample combined image after a first model that needs to be trained outputs the third sample parsed image.

In some embodiments, a combination manner is to connect two images on a channel dimension.

602: The server inputs the first sample combined image and the second sample combined image into a second model that needs to be trained, the second model outputting a training result image.

In one embodiment, the second model includes a third encoding module, a fourth encoding module, a second geometric deformation module, a second combination module, a second residual processing module, and a second decoding module.

The third encoding module is connected to the second geometric deformation module. The third encoding module is configured to encode the first sample combined image to generate a fourth sample encoded image. In some embodiments, the third encoding module is constructed by a convolutional neural network, and the third encoding module is an encoder. A quantity of channels of a convolution kernel in the third encoding module is the same as a quantity of channels of the first sample combined image. If a size of the first combined image is 32*32, and a quantity of channels is 6, a quantity of channels of a convolution kernel in the third encoding module is also 6.

The fourth encoding module is connected to the second combination module. The fourth encoding module is configured to encode the second sample combined image to generate a fifth sample encoded image. In some embodiments, the fourth encoding module and the third encoding module have the same structure.

Figure 7:
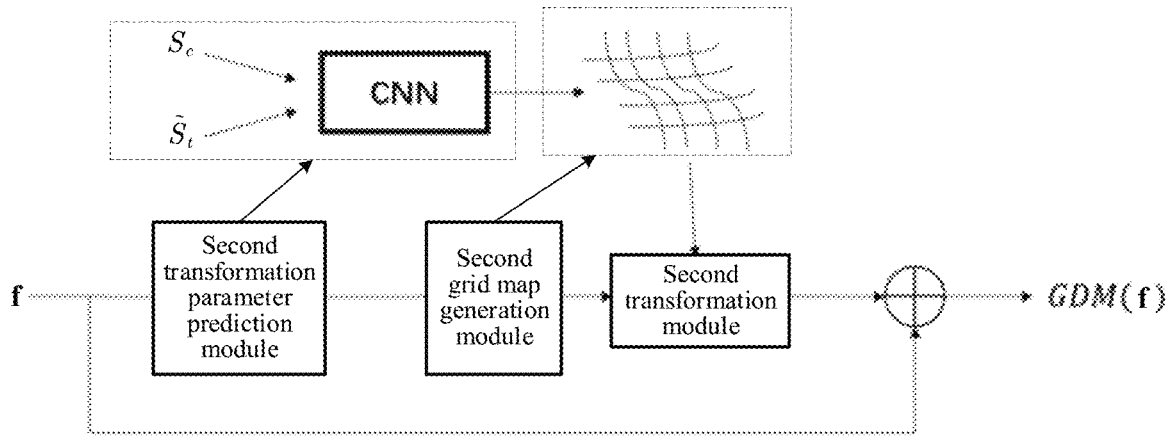
FIG. 7 is a schematic structural diagram of a second geometric deformation module according to an embodiment of this application.

The second geometric deformation module is connected to the third encoding module and the second combination module. The second geometric deformation module is configured to transform positions of parts of an object in the fourth sample encoded image in the image to generate a sixth sample encoded image. To make the structure of the second geometric deformation module clearer, FIG. 7 is a schematic structural diagram of a second geometric deformation module according to an embodiment of this application. FIG. 7 includes a first sample parsed image $S_c$, a third sample parsed image $\tilde{S}_t$, an inputted fourth sample encoded image f, a second transformation parameter prediction module, a second grid map generation module, a second transformation module, and a generated sixth sample encoded image GM (f). The second transformation parameter prediction module is configured to determine a second transformation parameter for transforming from $S_c$ to $\tilde{S}_t$ according to the convolutional neural network. The second grid map generation module is configured to generate a second grid map according to the second transformation parameter. The second transformation module is configured to transform the fourth sample encoded image f according to the second grid map.

The second combination module is connected to the second geometric deformation module, the fourth encoding module, and the second residual processing module. The second combination module is configured to combine the sixth sample encoded image and the fifth sample encoded image into the second sample combined image. In some embodiments, a combination manner is to connect two images on a channel dimension, and a quantity of channels of an obtained image is a sum of quantities of channels of the two images.

To make the structure of the second model described in this step clearer, FIG. 8 is a schematic structural diagram of a second model according to an embodiment of this application. FIG. 8 includes a first sample parsed image $S_c$, a first sample image $I_c$, a second sample pose image $P_t$, a third sample parsed image $\tilde{S}_t$, a third encoding module $E_{c2}$, a fourth encoding module $E_{t2}$, a second geometric deformation module $GDM_2$, a second combination module $C_2$, a second residual processing module $ResNet_2$, a second decoding module $DE_2$, and a generated training result image $\tilde{I}_t$. An input of the third encoding module is $I_1$ obtained after the first sample parsed image $S_c$ and the first sample image $I_c$ are combined. An input of the fourth encoding module is $I_2$ obtained after the second sample pose image $P_t$ and the third sample parsed image $\tilde{S}_t$ are combined. By using the second model provided in this application, after inputting the first combined image $I_1$ and the second combined image $I_2$ into the model, the training result image $\tilde{I}_t$ after the pose transformation can be obtained.

603: The server performs consistency detection on the training result image and the second sample image, and adjusts a second training parameter of the second model according to a detection result until a second image generation model is obtained.

In one embodiment, the server performs consistency detection on the training result image and the second sample image by using a second discriminator. For example, the server combines and inputs the first sample image $I_c$, the first sample parsed image $S_c$, the second sample pose image $P_t$, the third sample parsed image $\tilde{S}_t$, and the training result image $\tilde{I}_t$ into the second discriminator, and combines and inputs the first sample image $I_c$, the first sample parsed image $S_c$, the second sample pose image $P_t$, the third sample parsed image $\tilde{S}_t$, and the second sample image $I_t$ into the second discriminator, so that the second discriminator outputs a similarity between the training result image $\tilde{I}_t$ and the second sample pose image $P_t$, the similarity being used for representing consistency between the training result image $\tilde{I}_t$ and the second sample pose image $P_t$.

An example in which a result of the consistency detection is the similarity is used, and the server may determine, according to the similarity outputted by the second discriminator, whether to stop training the second model. When the similarity outputted by the second discriminator is greater than or equal to a second similarity threshold, it indicates that the training result image generated by the second model and the second sample pose image are similar enough, the second training parameter of the second model has converged to an appropriate value, and the second model can generate an image that looks like the real image, and therefore the server stops training the second model. When the similarity outputted by the second discriminator is less than the second similarity threshold, it indicates that the training result image generated by the second model and the second sample pose image are not similar enough, the second training parameter of the second model does not converge to an appropriate value, and the second model cannot generate an image that looks like the real image, and therefore the server needs to continue to train the second model. The server adjusts the second training parameter according to the similarity between the training result image and the second sample pose image. That is, the server repeatedly performs the foregoing step 601 to step 603, until the similarity outputted by the second discriminator is greater than or equal to the second similarity threshold. In this case, the second model is the second image generation model. In some embodiments, the second similarity threshold is 80%, 85%, 90%, or another value. This is not specifically limited in one embodiment.

Based on the foregoing implementation, the server may alternatively perform consistency detection on the training result image and the second sample image by using a multiscale discriminator. For example, the server adjusts a size of the training result image to obtain training result images of a plurality of sizes, and the server performs consistency detection on the training result images of a plurality of sizes and the second sample image separately.

To describe the structure of the multiscale discriminator clearer, FIG. 9 is a schematic structural diagram of a multiscale discriminator according to an embodiment of this application. FIG. 9 includes a real image pair $P^r$ obtained by combining the first sample image $I_c$, the first sample parsed image $S_c$, the second sample pose image $P_t$, the third sample parsed image $\tilde{S}_t$, and the training result image $\tilde{I}_t$; further includes a fake image pair $P^f$, that is, a generated image, obtained by combining the first sample image $I_c$, the first sample parsed image $S_c$, the second sample pose image $P_t$, the third sample parsed image $\tilde{S}_t$, and the second sample image $I_t$; and further includes a multiscale discriminator $D_k$.

Correspondingly, the process described in the foregoing step 601 to step 603 can also be represented by using formula (7):

$$\tilde{I}_t = DE_2(GDM_2(E_{c2}(I_c, S_c)), E_{t2}(P_t, \tilde{S}_t)), \quad (7)$$

where $\tilde{I}_t$ represents the training result image, $DE_2$ represents the second decoding module, $GDM_2$ represents the second geometric deformation module, $E_{c2}$ represents the third encoding module, $I_c$ represents the first sample image, $S_c$ represents the first sample parsed image, $E_{t2}$ represents the fourth encoding module, $P_t$ represents the second sample pose image, and $\tilde{S}_t$ represents the third sample parsed image.

A total loss in the process of training the second image generation model is represented by using $L_2^{total}$. $L_2^{total}$ includes an adversarial loss $L_2^{adv}$, a feature matching loss $L^{fm}$, an L1 norm loss $L^{L1}$, a perceptual loss $L^P$, and a reconstruction loss $L^{recon}$. A background mask is introduced into the L1 norm loss. In one embodiment, the second image generation model is referred to as a second generator $G_2$.

A value of the adversarial loss is obtained by using the following formula (8) to formula (12):

$$P^r = (I_c, S_c, P_t, \tilde{S}_t, I_t); \quad (8)$$

$$P^f = (I_c, S_c, P_t, \tilde{S}_t, \tilde{I}_t); \quad (9)$$

$$L_{D_2}^{adv} = \sum_{k=1}^{3}(D_k(P^r)-1)^2 + D_k(P^f)^2; \quad (10)$$

$$L_{G_2}^{adv} = \sum_{k=1}^{3}(D_k(P_t, \tilde{S}_t)-1)^2; \quad (11)$$

and $$L_2^{adv} = L_{D_1}^{adv} + L_{G_1}^{adv}, \quad (12)$$

where $P^r$ represents the real image pair, $P^f$ represents the fake image pair, $I_c$ represents the first sample image, $S_c$ represents the first sample parsed image, $P_t$ represents the second sample pose image, $\tilde{S}_t$ represents the third sample parsed image, $I_t$ represents the second sample image, $\tilde{I}_t$ represents the training result image, $L_{D_2}^{adv}$ represents the adversarial loss of the second generator, $L_{G_2}^{adv}$ represents the adversarial loss of the second generator, and $L_2^{adv}$ represents the adversarial loss.

The feature matching loss $L^{fm}$ is obtained by using the formula (13):

$$L^{fm} = \sum_{k=1}^{3}\sum_{i=1}^{5} \|D_k^{(i)}(P^r) - D_k^{(i)}(P^f)\|_1, \quad (13)$$

where $L^{fm}$ represents the feature matching loss, $D_k^{(i)}$ represents an $i^{th}$ layer of feature map of a $k^{th}$ multiscale discriminator, $P^r$ represents the real image pair, $P^f$ represents the fake image pair, and 1 represents 1-norm.

The feature matching loss is obtained by using the formula (14):

$$L^{L1} = \|(I_t - \tilde{I}_t) \otimes (1 + M)\|_1, \quad (14)$$

where $L^{L1}$ represents the L1 norm loss, $I_t$ represents the second sample image, $I_c$ represents the first sample image, $\otimes$ represents the multiplication of elements, M represents a background mask, and 1 represents 1-norm.

The perceptual loss $L^P$ is obtained by using the formula (15):

$$L^P(I_t, \tilde{I}_t) = \sum_{v=1}^{5} \|\Phi^{(v)}(I_t) - \Phi^{(v)}(\tilde{I}_t)\|_1, \quad (15)$$

where $L^P$ represents the perceptual loss, $I_t$ represents the second sample image, $\tilde{I}_t$ represents the training result image, $\Phi^{(v)}$ represents a $v^{th}$ layer of a feature map obtained after an image is processed by a pre-trained VGG19 (a convolutional neural network), and 1 represents 1-norm.

The reconstruction loss $L^{recon}$ may be obtained by using the formula (16) and formula (17):

$$\tilde{I}_t = DE_2(I_c, P_t); \quad (16)$$

and $$L^{recon} = \|I_c - DE_2(\tilde{I}_t, P_c)\|_1, \quad (17)$$

where $\tilde{I}_t$ represents the training result image, $DE_2$ represents the second decoding module, $I_c$ represents the first sample image, $P_t$ represents the second sample pose image, $L^{recon}$ represents the reconstruction loss, $P_c$ represents the first sample pose image, and 1 represents 1-norm.

A total loss $L_2^{total}$ is obtained by using the formula (18):

$$L_2^{total} = L_2^{adv} + \lambda^{fm} L^{fm} + \lambda^{L1} L^{L1} + \lambda^P L^P + \lambda^{recon} L^{recon}, \quad (18)$$

where $L_2^{total}$ represents the total loss, $L_2^{adv}$ represents the adversarial loss, $\lambda^{fm}$ represents a weighting coefficient of the feature matching loss, $L^{fm}$ represents the feature matching loss, $\lambda^{L1}$ represents a weighting coefficient of the L1 norm loss, $L^{L1}$ represents the L1 norm loss, $\lambda^P$ represents a weighting coefficient of the perceptual loss, $L^P$ represents the perceptual loss, $\lambda^{recon}$ represents a weighting coefficient of the reconstruction loss, and $L^{recon}$ represents the reconstruction loss.

Figure 10:
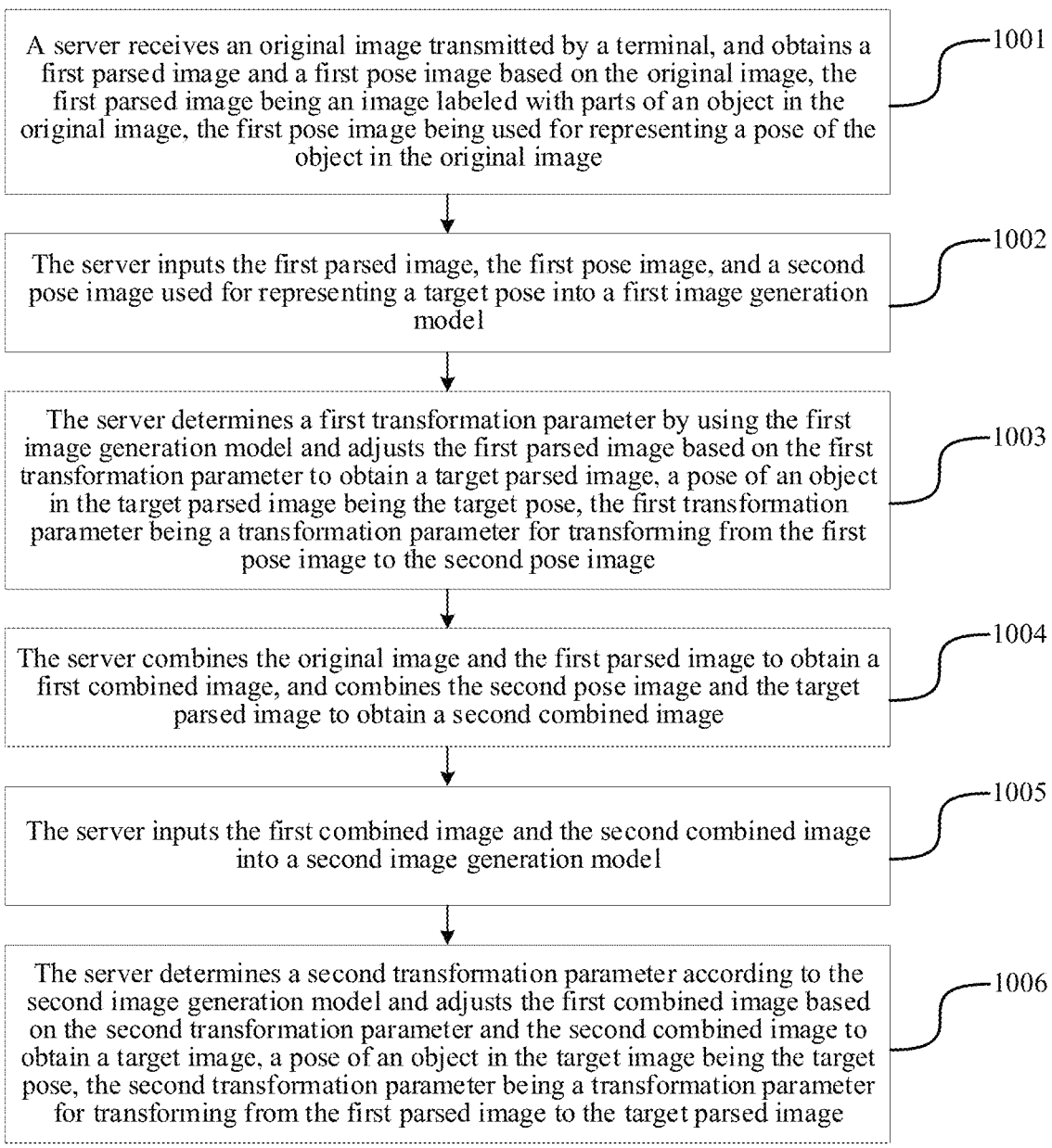
FIG. 10 is a flowchart of a target image generation method according to an embodiment of this application.

FIG. 10 is a flowchart of a target image generation method according to an embodiment of this application. As shown in FIG. 10, the method includes the following steps:

1001: A server receives an original image transmitted by a terminal, and obtains a first parsed image and a first pose image based on the original image, the first parsed image being an image labeled with parts of an object in the original image, the first pose image being used for representing a pose of the object in the original image.

In one embodiment, the user may transmit an image generation request to the server by using an application program in the terminal, and the image generation request carries the original image. After receiving the image generation request, the server may obtain the original image from the image generation request.

In some embodiments, this step is completed by using the following substeps.

Figure 11:
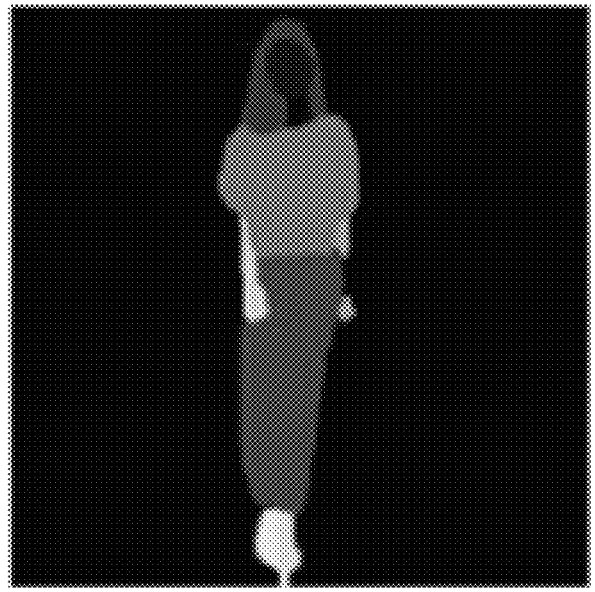
FIG. 11 is a schematic diagram of a human body parsed image according to an embodiment of this application.

In step 1001a, the server parses the original image, and labels the parts of the object in the original image to obtain a first parsed image. An example in which the object is a human body is used, and the server distinguishes different parts of the human body by using regions of different colors, for example, a head, a face, a body, arms, legs, and feet. To better understand the first parsed image, FIG. 11 is a schematic diagram of a human body parsed image according to an embodiment of this application. FIG. 11 includes a human body, parts of the human body are divided into a plurality of regions, and the regions are distinguished by using different colors.

An example in which the object is a human body is still used, and the server performs image segmentation on the original image to obtain a human body image from the original image. The server performs image recognition on the human body image to obtain regions of different parts of the human body in the human body image. The server renders different regions in the human body image by using different pixel values to obtain the first parsed image.

In step 1001b, the server performs pose extraction on the original image, and abstracts the object in the original image into a plurality of position points, and the plurality of position points can represent the pose of the object. An example in which the object is a human body is used, and the server abstracts a plurality of parts of the human body into position points, for example, abstracts joint parts and parts such as eyes and mouth into position points.

In one embodiment, the server obtains a second pose image, and the second pose image is an image used for representing a target pose. In some embodiments, the second pose image is a pose image determined by the server from at least one preset pose images, or a pose image obtained according to an image uploaded by the terminal. This is not limited in one embodiment.

In some embodiments, if the second pose image is an image determined by the server from at least one preset pose images, the server is correspondingly maintained with a pose image library. The pose image library includes at least one pose image, each pose image includes a plurality of position points, and the plurality of position points form an abstract pose. The user previews at least one pose image in the pose image library by using the application program in the terminal. When any pose image is selected, the terminal transmits an image identifier of the selected pose image and the original image to the server together. The server determines, according to the image identifier, the pose image selected by the user, and uses the pose image as the second pose image.

In some embodiments, if the second pose image is a pose image obtained according to an image uploaded by the terminal, the server receives the image transmitted by the terminal. In some embodiments, the image and the original image include different objects. For example, the original image is a side-body image of a female, and the image is a front-body image of a man. When the user intends to transform a pose of the female into a pose of the male in the image, the user uploads the side-body image of the female and the front-body image of the male to the server by using the terminal at the same time. After receiving the image, the server may perform pose extraction on the image, and uses an extracted image including a plurality of position points as the second pose image. The second pose image includes a target pose.

Figure 12:
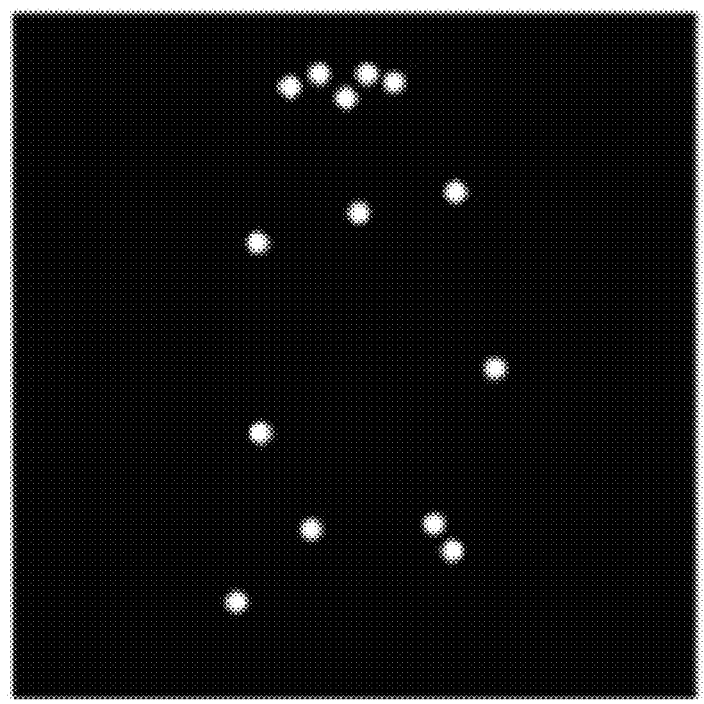
FIG. 12 is a schematic diagram of a pose image according to an embodiment of this application.

To better understand a pose image, FIG. 12 is a schematic diagram of a pose image according to an embodiment of this application. FIG. 12 is used for representing a pose of a human body, and the pose is represented by using an abstract human body formed by a plurality of position points. For example, three points on the leftmost side represent a right shoulder, a right elbow, and a right palm respectively, and correspondingly, three points on the rightmost side represent a left shoulder, a left elbow, and a left palm.

1002. The server inputs the first parsed image, the first pose image, and a second pose image used for representing a target pose into a first image generation model.

In some embodiments, the first image generation model is a model obtained through training based on a generative adversarial network (GAN) by using the first sample image and the second sample image, and capable of generating a parsed image including a target pose. For a process of training the model, refer to the foregoing step 201 to 204, and details are not described herein again.

1003: The server determines a first transformation parameter by using the first image generation model and adjusts the first parsed image based on the first transformation parameter to obtain a target parsed image, a pose of an object in the target parsed image being the target pose, the first transformation parameter being a transformation parameter for transforming from the first pose image to the second pose image.

In some embodiments, this step is implemented by using the following substeps.

In step 1003a, the server inputs the first pose image and the second pose image into a first convolutional neural network of the first image generation model, and the first convolutional neural network determines the first transformation parameter.

In step 1003b, after obtaining the first transformation parameter, the server encodes the first parsed image by using the first image generation model to obtain a first encoded image, and encodes the first pose image to obtain a second encoded image. Certainly, the server may alternatively obtain the first encoded image and the second encoded image through encoding before obtaining the first transformation parameter. This is not specifically limited in one embodiment. In some embodiments, the foregoing encoding process is implemented by using encoding modules with the same structure, for example, is implemented by using the first encoding module and the second encoding module described in step 203. The implementation process and the foregoing step 203 belong to the same concept, and details are not described herein again.

In step 1003c, the server transforms the first encoded image into a third encoded image based on the first transformation parameter. In one embodiment, the server generates a first grid map based on the first transformation parameter, coordinates of a vertex in the first grid map being used for indicating a corresponding position of the vertex in the first encoded image. The server transforms each pixel in the first encoded image into a corresponding vertex in the first grid map according to the coordinates of the vertex in the first grid map to obtain the third encoded image. In some embodiments, the foregoing transformation process is implemented by using a geometric deformation module, for example, is implemented by using the first geometric deformation module described in step 203. The implementation process and the foregoing step 203 belong to the same concept, and details are not described herein again. In one embodiment, the server performs sampling at a corresponding position of the first encoded image according to coordinates of each vertex in the first grid map, and sets a pixel value obtained through sampling as a pixel value of the vertex, to obtain the third encoded image.

In step 1003d, the server performs residual processing on the second encoded image and the third encoded image to obtain a fourth encoded image. In one embodiment, after combining the second encoded image and the third encoded image, the server may input an image obtained through combination into a residual neural network (ResNet) network, the ResNet network including a plurality of residual blocks. The server inputs a difference between an output and input of each residual block and the image obtained through combination into a next residual block, to obtain the fourth encoded image finally. A combination manner and the manner of connecting two images on a channel dimension described in step 203 belong to the same concept, and details are not described herein again.

In step 1003e, the server decodes the fourth encoded image to obtain a target parsed image.

1004: The server combines the original image and the first parsed image to obtain a first combined image, and combines the second pose image and the target parsed image to obtain a second combined image.

After obtaining the target parsed image, the server may obtain the first combined image and the second combined image through combination in the following two manners. One combination manner is to connect two images on a channel dimension, and the other combination manner is to connect two images in a channel direction.

The combination manner on a channel dimension has been described in step 203, and details are not described herein again. The combination manner in a channel direction is to add sizes of two images with the same quantity of channels, to obtain an image with an unchanged quantity of channels and a changed size. For example, a size of the original image is 32*32, three channels are R, G, and B, a size of the first parsed image is 32*32, and three channels are R, G, and B. The server connects the channels R, G, and B of the original image to the channels R, G, and B of the first parsed image respectively, to obtain a first combined image with a size of 64*32 and three channels of R, G, and B.

1005: The server inputs the first combined image and the second combined image into a second image generation model.

In some embodiments, the second image generation model and the first image generation model have the same structure, and both are models obtained through training by using the GAN. For a method for training the second image generation model, refer to the description of step 601 to step 603, and details are not described herein again. Certainly, the second image generation model and the first image generation model may alternatively have different structures. This is not specifically limited in one embodiment.

1006: The server determines a second transformation parameter according to the second image generation model and adjusts the first combined image based on the second transformation parameter and the second combined image to obtain a target image, a pose of an object in the target image being the target pose, the second transformation parameter being a transformation parameter for transforming from the first parsed image to the target parsed image.

In some embodiments, this step is implemented by using the following substeps.

In step 1006a, the server inputs the first parsed image and the target parsed image into a second convolutional neural network of the second image generation model, and the second convolutional neural network determines the second transformation parameter for transforming from the first parsed image to the target parsed image.

In step 1006b, after obtaining the second transformation parameter, the server encodes the first combined image by using the second image generation model to obtain a fifth encoded image, and encodes the second combined image to obtain a sixth encoded image. Certainly, the server may alternatively obtain the fifth encoded image and the sixth encoded image through encoding before obtaining the second transformation parameter. This is not specifically limited in one embodiment. In some embodiments, the foregoing encoding process may be implemented by using encoding modules with the same structure, for example, may be implemented by using the third encoding module and the fourth encoding module described in step 602. The implementation process and the foregoing step 602 belong to the same concept, and details are not described herein again.

In step 1006c, the server transforms the fifth encoded image into a seventh encoded image based on the second transformation parameter. For example, the server generates a second grid map based on the second transformation parameter, coordinates of a vertex in the second grid map being used for indicating a corresponding position of the vertex in the fifth encoded image. The server transforms each pixel in the fifth encoded image into a corresponding vertex in the second grid map according to the coordinates of the vertex in the second grid map to obtain the seventh encoded image. In some embodiments, the foregoing transformation process is implemented by using a geometric deformation module, for example, is implemented by using the second geometric deformation module described in step 602. The implementation process and the foregoing step 602 belong to the same concept, and details are not described herein again. In one embodiment, the server performs sampling at a corresponding position of the fifth encoded image according to coordinates of each vertex in the second grid map, and sets a pixel value obtained through sampling as a pixel value of the vertex, to obtain the seventh encoded image.

In step 1006d, the server performs residual processing on the sixth encoded image and the seventh encoded image to obtain an eighth encoded image. In one embodiment, after combing the sixth encoded image and the seventh encoded image, the server may input an image obtained through combination into an ResNet network, the ResNet network including a plurality of residual blocks. The server inputs a difference between an output and input of each residual block and the image obtained through combination into a next residual block, to obtain the eighth encoded image finally. A combination manner may be the manner of connecting two images on a channel dimension described in step 203, and details are not described herein again.

In step 1006e, the server decodes the eighth encoded image to obtain a target image.

Figure 13:
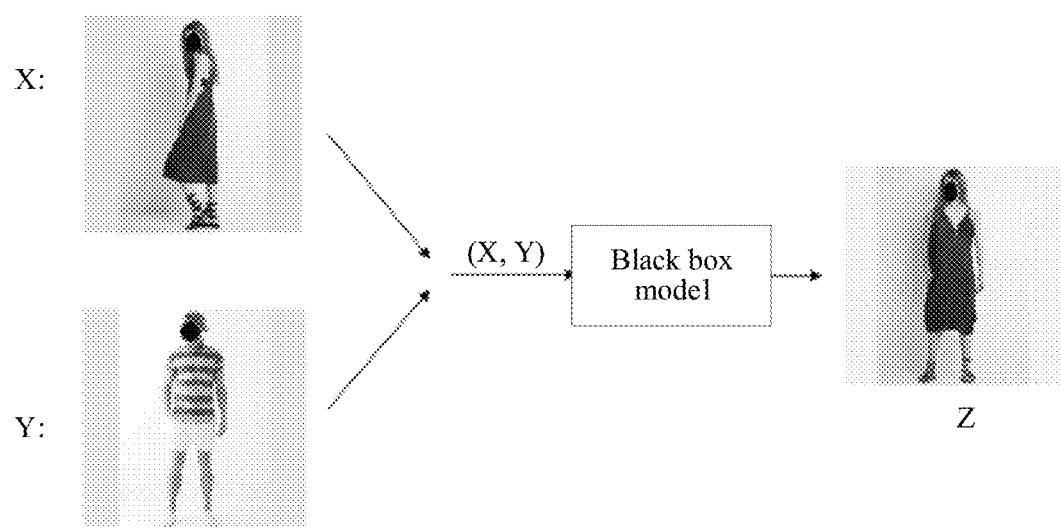
FIG. 13 is a schematic diagram of a black box model according to an embodiment of this application.

The foregoing step 1001 to step 1006 schematically show a process of generating a target image by using two image generation models at two stages. The foregoing process may alternatively be implemented by using one image generation model. The image generation model may be a black box model, and after inputting an original image and an image including a target pose, a target image may be outputted. FIG. 13 is a schematic diagram of a black box model according to an embodiment of this application. FIG. 13 includes an original image X, an image Y including a target pose, a black box model, and a generated target image Z.

In one embodiment, a first transformation parameter is determined by using a first image generation model, and a first parsed image is adjusted based on the first transformation parameter, so that a pose in the first parsed image and a pose in a generated target parsed image are aligned. A second image generation model determines a second transformation parameter according to the target parsed image obtained by the first image generation model, and adjusts a combined original image and the first parsed image based on the second transformation parameter, so that pixels in the original image and pixels in a generated target image are aligned, and better image details are achieved. Because the poses in the parsed images before and after the transformation are aligned, images before and after the transformation can be kept in spatial alignment, so that the final generated target image can ensure both spatial alignment and clear details.

Figure 14:
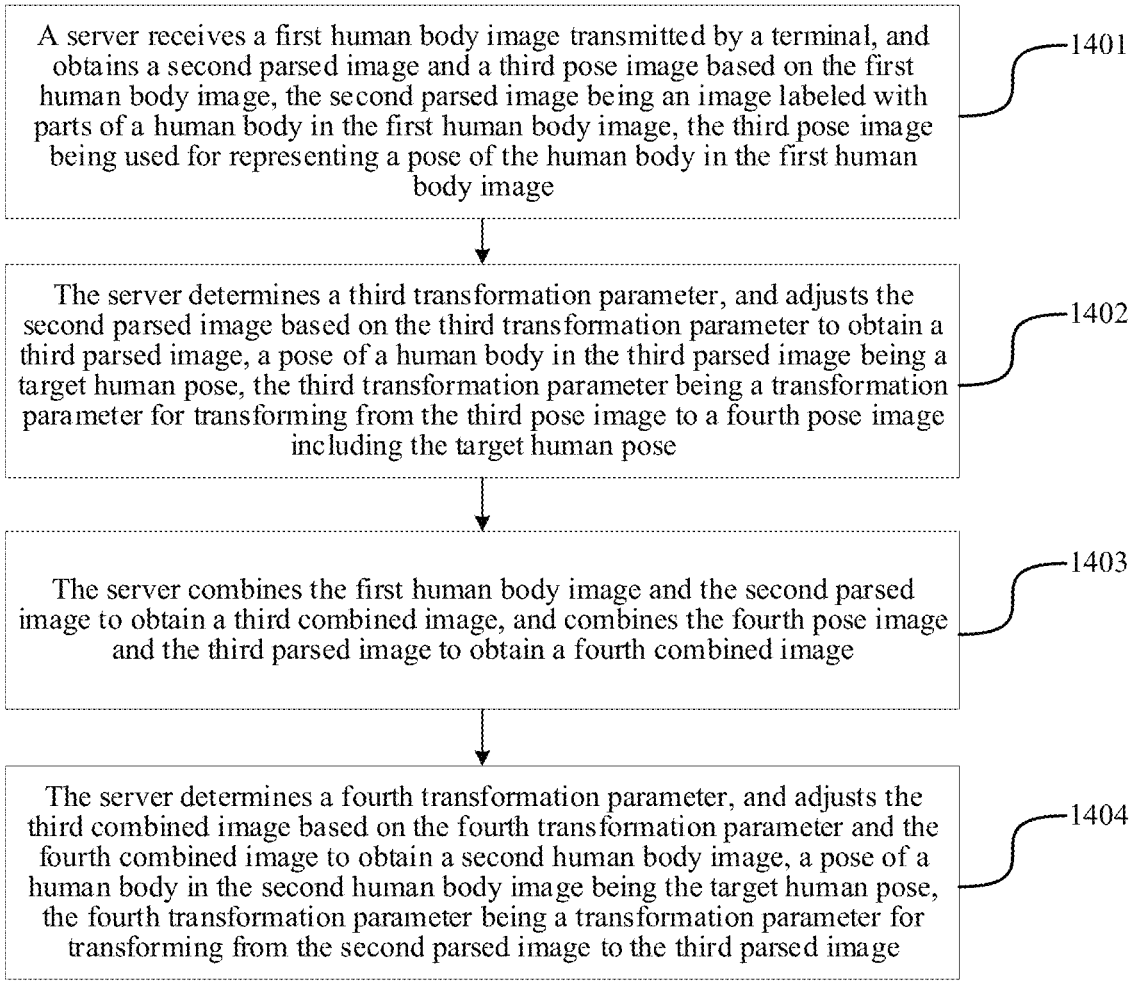
FIG. 14 is a flowchart of a human pose transformation method according to an embodiment of this application.

FIG. 14 is a flowchart of a human pose transformation method according to an embodiment of this application. As shown in FIG. 14, the method includes the following steps:

1401. A server receives a first human body image transmitted by a terminal, and obtains a second parsed image and a third pose image based on the first human body image, the second parsed image being an image labeled with parts of a human body in the first human body image, the third pose image being used for representing a pose of the human body in the first human body image.

This step and step 1001 belong to the same concept, and for a specific implementation, refer to step 1001. Details are not described herein again.

1402: The server determines a third transformation parameter, and adjusts the second parsed image based on the third transformation parameter to obtain a third parsed image, a pose of a human body in the third parsed image being a target human pose, the third transformation parameter being a transformation parameter for transforming from the third pose image to a fourth pose image including the target human pose.

In this step, the server may directly determine, by using a convolutional neural network, the third transformation parameter for transforming from the third pose image to the fourth pose image including the target human pose, and adjust the second parsed image based on the third transformation parameter by using an ResNet network, to obtain the third parsed image.

In one embodiment, the server may alternatively determine, by using the first image generation model, the third transformation parameter for transforming from the third pose image to the fourth pose image including the target human pose and adjust the second parsed image based on the third transformation parameter, to obtain the third parsed image. For a specific implementation, refer to step 1003, and details are not described herein again.

1403: The server combines the first human body image and the second parsed image to obtain a third combined image, and combines the fourth pose image and the third parsed image to obtain a fourth combined image.

This step and step 1004 belong to the same concept, and for a specific implementation, refer to step 1004. Details are not described herein again.

1404. The server determines a fourth transformation parameter, and adjusts the third combined image based on the fourth transformation parameter and the fourth combined image to obtain a second human body image, a pose of a human body in the second human body image being the target human pose, the fourth transformation parameter being a transformation parameter for transforming from the second parsed image to the third parsed image.

In this step, the server may directly determine, by using a convolutional neural network, the fourth transformation parameter for transforming from the second parsed image to the third parsed image, and adjust the third combined image based on the fourth transformation parameter and the fourth combined image, to obtain the second human body image.

In one embodiment, the server may alternatively determine, by using the second image generation model, the fourth transformation parameter for transforming from the second parsed image to the third parsed image, and adjust the third combined image based on the fourth transformation parameter and the fourth combined image, to obtain the second human body image. For a specific implementation, refer to step 1004, and details are not described herein again.

In one embodiment, a third transformation parameter is determined, and a second parsed image is adjusted based on the third transformation parameter, so that a pose in the second parsed image and a pose in a generated third parsed image are aligned. A fourth transformation parameter is determined by using the generated third parsed image, and the first human body image and the second parsed image after being combined are adjusted based on the fourth transformation parameter, so that pixels in the first human body image and pixels in the generated second human body image are aligned, and better image details are achieved. Because the poses in the parsed images before and after the transformation are aligned, images before and after the transformation can be kept in spatial alignment, so that the final generated second human body image can ensure both spatial alignment and clear details.

Figure 15:
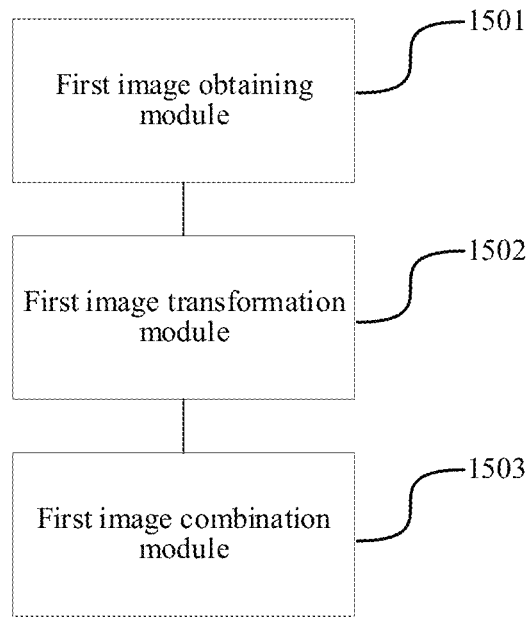
FIG. 15 is a block diagram of a target image generation apparatus according to an embodiment of this application.

FIG. 15 is a block diagram of a target image generation apparatus according to an embodiment of this application. As shown in FIG. 15, the apparatus includes a first image obtaining module 1501, a first image transformation module 1502, and a first image combination module 1503.

The first image obtaining module 1501 is configured to obtain a first parsed image and a first pose image based on an original image, the first parsed image being an image labeled with parts of an object in the original image, the first pose image being used for representing a pose of the object in the original image.

The first image transformation module 1502 is configured to input the first parsed image, the first pose image, and a second pose image used for representing a target pose into a first image generation model, the first image generation model determining a first transformation parameter and adjusting the first parsed image based on the first transformation parameter to obtain a target parsed image, a pose of an object in the target parsed image being the target pose, the first transformation parameter being a transformation parameter for transforming from the first pose image to the second pose image.

The first image combination module 1503 is configured to: combine the original image and the first parsed image to obtain a first combined image; and combine the second pose image and the target parsed image to obtain a second combined image.

The first image transformation module 1502 is further configured to input the first combined image and the second combined image into a second image generation model, the second image generation model determining a second transformation parameter and adjusting the first combined image based on the second transformation parameter and the second combined image to obtain a target image, a pose of an object in the target image being the target pose, the second transformation parameter being a transformation parameter for transforming from the first parsed image to the target parsed image.

In another embodiment, the first image transformation module 1502 is configured to: input the first pose image and the second pose image into a first convolutional neural network to determine the first transformation parameter, the first image generation model encoding the first parsed image to obtain a first encoded image, and encoding the first pose image to obtain a second encoded image; transform the first encoded image into a third encoded image based on the first transformation parameter; perform residual processing on the second encoded image and the third encoded image to obtain a fourth encoded image; and decode the fourth encoded image.

In another embodiment, the first image transformation module 1502 is configured to: generate a first grid map based on the first transformation parameter, coordinates of a vertex in the first grid map being used for indicating a corresponding position of the vertex in the first encoded image; and transform a pixel in the first encoded image into a corresponding vertex in the first grid map according to the coordinates of the vertex in the first grid map to obtain the third encoded image.

In another embodiment, the first image transformation module 1502 is configured to: input the first parsed image and the target parsed image into a second convolutional neural network to determine the second transformation parameter, the second image generation model encoding the first combined image to obtain a fifth encoded image, and encoding the second combined image to obtain a sixth encoded image; transform the fifth encoded image into a seventh encoded image based on the second transformation parameter; perform residual processing on the sixth encoded image and the seventh encoded image to obtain an eighth encoded image; and decode the eighth encoded image.

In another embodiment, the first image transformation module 1502 is configured to: generate a second grid map based on the second transformation parameter, coordinates of a vertex in the second grid map being used for indicating a corresponding position of the vertex in the fifth encoded image; and transform a pixel in the fifth encoded image into a corresponding vertex in the second grid map according to the coordinates of the vertex in the second grid map to obtain the seventh encoded image.

In another embodiment, the apparatus further includes a model training module, configured to: obtain a first sample parsed image and a first sample pose image based on a first sample image, the first sample image being any sample image in a plurality of sample images, the first sample parsed image being an image labeled with parts of an object in the first sample image, the first sample pose image being used for representing a pose of the object in the first sample image; obtain a second sample parsed image and a second sample pose image based on a second sample image, the second sample image being a target image including the same object as the first sample image, the second sample parsed image being an image labeled with parts of an object in the second sample image, the second sample pose image being used for representing a pose of the object in the second sample image; input the first parsed image, the first sample pose image, and the second sample pose image into a first model that needs to be trained, and output, by the first model, a third sample parsed image; and perform consistency detection on the second sample parsed image and the third sample parsed image, and adjust a first training parameter of the first model according to a detection result until the first image generation model is obtained.

In another embodiment, the model training module is further configured to: combine the first sample image and the first sample parsed image to obtain a first sample combined image; combine the third sample parsed image and the second sample pose image to obtain a second sample combined image; input the first sample combined image and the second sample combined image into a second model that needs to be trained, and output, by the second model, a training result image; and perform consistency detection on the training result image and the second sample image, and adjust a second training parameter of the second model according to a detection result until the second image generation model is obtained.

In another embodiment, the model training module is further configured to: adjust a size of the training result image to obtain training result images of a plurality of sizes; and perform consistency detection on the training result images of a plurality of sizes and the second sample image separately.

In one embodiment, a first transformation parameter is determined by using a first image generation model, and a first parsed image is adjusted based on the first transformation parameter, so that a pose in the first parsed image and a pose in a generated target parsed image are aligned. A second image generation model determines a second transformation parameter according to the target parsed image obtained by the first image generation model, and adjusts a combined original image and the first parsed image based on the second transformation parameter, so that pixels in the original image and pixels in a generated target image are aligned, and better image details are achieved. Because the poses in the parsed images before and after the transformation are aligned, images before and after the transformation can be kept in spatial alignment, so that the final generated target image can ensure both spatial alignment and clear details.

Figure 16:
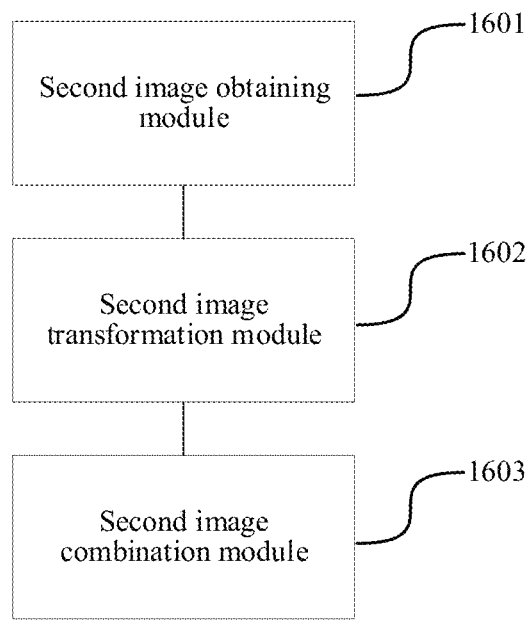
FIG. 16 is a block diagram of a human pose transformation apparatus according to an embodiment of this application.

FIG. 16 is a block diagram of a human pose transformation apparatus according to an embodiment of this application. As shown in FIG. 16, the apparatus includes a second image obtaining module 1601, a second image transformation module 1602, and a second image combination module 1603.

The second image obtaining module 1601 is configured to obtain a second parsed image and a third pose image based on a first human body image, the second parsed image being an image labeled with parts of a human body in the first human body image, the third pose image being used for representing a pose of the human body in the first human body image.

The second image transformation module 1602 is configured to: determine a third transformation parameter, and adjust the second parsed image based on the third transformation parameter to obtain a third parsed image, a pose of a human body in the third parsed image being a target human pose, the third transformation parameter being a transformation parameter for transforming from the third pose image to a fourth pose image used for representing the target human pose.

The second image combination module 1603 is configured to: combine the first human body image and the second parsed image to obtain a third combined image; and combine the fourth pose image and the third parsed image to obtain a fourth combined image.

The second image transformation module 1602 is further configured to: determine a fourth transformation parameter, and adjust the third combined image based on the fourth transformation parameter and the fourth combined image to obtain a second human body image, a pose of a human body in the second human body image being the target human pose, the fourth transformation parameter being a transformation parameter for transforming from the second parsed image to the third parsed image.

In one embodiment, a third transformation parameter is determined, and a second parsed image is adjusted based on the third transformation parameter, so that a pose in the second parsed image and a pose in a generated third parsed image are aligned. A fourth transformation parameter is determined by using the generated third parsed image, and the first human body image and the second parsed image after being combined are adjusted based on the fourth transformation parameter, so that pixels in the first human body image and pixels in the generated second human body image are aligned, and better image details are achieved. Because the poses in the parsed images before and after the transformation are aligned, images before and after the transformation can be kept in spatial alignment, so that the final generated second human body image can ensure both spatial alignment and clear details.

Figure 17:
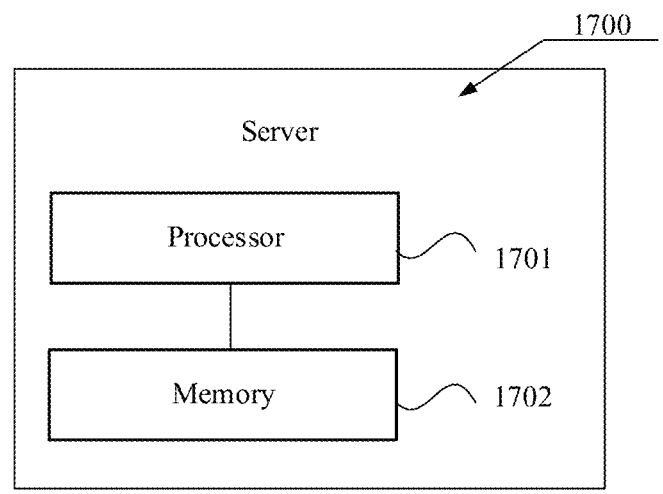
FIG. 17 is a schematic structural diagram of a server according to an embodiment of this application.

FIG. 17 is a schematic structural diagram of a server according to an embodiment of this application. The server 1700 may vary greatly due to different configurations or performance, and may include one or more central processing units (CPUs) 1701 and one or more memories 1702. The memory 1702 stores at least one instruction, the at least one instruction being loaded by the processor 1701 to implement the following operations:

obtaining a first parsed image and a first pose image based on an original image, the first parsed image being an image labeled with parts of an object in the original image, the first pose image being used for representing a pose of the object in the original image;

inputting the first parsed image, the first pose image, and a second pose image used for representing a target pose into a first image generation model, and determining, by the first image generation model, a first transformation parameter and adjusting the first parsed image based on the first transformation parameter to obtain a target parsed image, a pose of an object in the target parsed image being the target pose, the first transformation parameter being a transformation parameter for transforming from the first pose image to the second pose image;

combining the original image and the first parsed image to obtain a first combined image; combining the second pose image and the target parsed image to obtain a second combined image; and inputting the first combined image and the second combined image into a second image generation model, the second image generation model determining a second transformation parameter and adjusting the first combined image based on the second transformation parameter and the second combined image to obtain a target image, a pose of an object in the target image being the target pose, the second transformation parameter being a transformation parameter for transforming from the first parsed image to the target parsed image.

In one embodiment, the processor 1701 may further perform the following operations:

inputting the first pose image and the second pose image into a first convolutional neural network to determine the first transformation parameter, the first image generation model encoding the first parsed image to obtain a first encoded image, and encoding the first pose image to obtain a second encoded image;

transforming the first encoded image into a third encoded image based on the first transformation parameter;

performing residual processing on the second encoded image and the third encoded image to obtain a fourth encoded image; and [0194] decoding the fourth encoded image.

In one embodiment, the processor 1701 may further perform the following operations:

generating a first grid map based on the first transformation parameter, coordinates of a vertex in the first grid map being used for indicating a position of the vertex in the first encoded image; and transforming a pixel in the first encoded image into a corresponding vertex in the first grid map according to the coordinates of the vertex in the first grid map to obtain the third encoded image.

In one embodiment, the processor 1701 may further perform the following operations:

inputting the first parsed image and the target parsed image into a second convolutional neural network to determine the second transformation parameter;

the second image generation model encoding the first combined image to obtain a fifth encoded image, and encoding the second combined image to obtain a sixth encoded image;

transforming the fifth encoded image into a seventh encoded image based on the second transformation parameter;

performing residual processing on the sixth encoded image and the seventh encoded image to obtain an eighth encoded image; and decoding the eighth encoded image.

In one embodiment, the processor 1701 may further perform the following operations:

generating a second grid map based on the second transformation parameter, coordinates of a vertex in the second grid map being used for indicating a corresponding position of the vertex in the fifth encoded image; and transforming a pixel in the fifth encoded image into a corresponding vertex in the second grid map according to the coordinates of the vertex in the second grid map to obtain the seventh encoded image.

In one embodiment, the processor 1701 may further perform the following operations: [0208] obtaining a first sample parsed image and a first sample pose image based on a first sample image, the first sample image being any sample image in a plurality of sample images, the first sample parsed image being an image labeled with parts of an object in the first sample image, the first sample pose image being used for representing a pose of the object in the first sample image;

obtaining a second sample parsed image and a second sample pose image based on a second sample image, the second sample image being an image including the same object as the first sample image, the second sample parsed image being an image labeled with parts of an object in the second sample image, the second sample pose image being used for representing a pose of the object in the second sample image;

inputting the first parsed image, the first sample pose image, and the second sample pose image into a first model that needs to be trained, and outputting, by the first model, a third sample parsed image; and performing consistency detection on the second sample parsed image and the third sample parsed image, and adjusting a first training parameter of the first model according to a detection result until the first image generation model is obtained.

In one embodiment, the processor 1701 may further perform the following operations:

combining the first sample image and the first sample parsed image to obtain a first sample combined image; combining the third sample parsed image and the second sample pose image to obtain a second sample combined image;

inputting the first sample combined image and the second sample combined image into a second model that needs to be trained, and outputting, by the second model, a training result image; and performing consistency detection on the training result image and the second sample image, and adjusting a second training parameter of the second model according to a detection result until the second image generation model is obtained.

In one embodiment, the processor 1701 may further perform the following operations:

adjusting a size of the training result image to obtain training result images of a plurality of sizes; and performing consistency detection on the training result images of a plurality of sizes and the second sample image separately.

Figure 18:
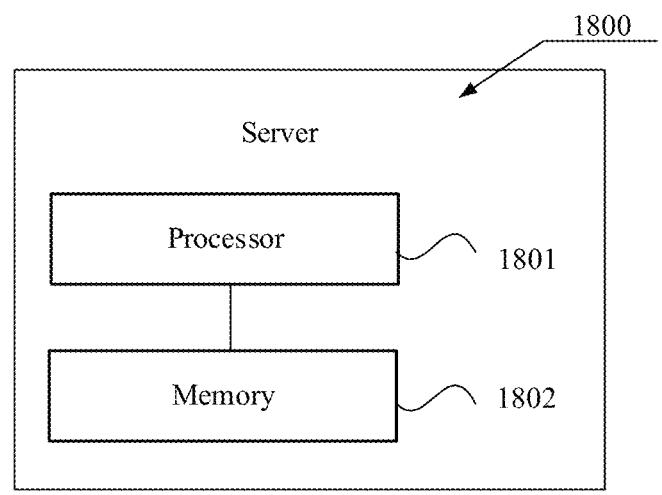
FIG. 18 is a schematic structural diagram of a server according to an embodiment of this application.

FIG. 18 is a schematic structural diagram of a server according to an embodiment of this application. The server 1800 may vary greatly due to different configurations or performance, and may include one or more central processing units (CPUs) 1801 and one or more memories 1802. The memory 1802 stores at least one instruction, the at least one instruction being loaded by the processor 1801 to implement the following operations:

obtaining a second parsed image and a third pose image based on a first human body image, the second parsed image being an image labeled with parts of a human body in the first human body image, the third pose image being used for representing a pose of the human body in the first human body image;

determining a third transformation parameter, and adjusting the second parsed image based on the third transformation parameter to obtain a third parsed image, a pose of a human body in the third parsed image being a target human pose, the third transformation parameter being a transformation parameter for transforming from the third pose image to a fourth pose image used for representing the target human pose;

combining the first human body image and the second parsed image to obtain a third combined image; combining the fourth pose image and the third parsed image to obtain a fourth combined image; and determining a fourth transformation parameter, and adjusting the third combined image based on the fourth transformation parameter and the fourth combined image to obtain a second human body image, a pose of a human body in the second human body image being the target human pose, the fourth transformation parameter being a transformation parameter for transforming from the second parsed image to the third parsed image.

Certainly, the server may also include a wired or wireless network interface, a keyboard, an I/O interface, and other components to facilitate I/O. The server may also include other components to implement device functions. Details are not described herein again.

An embodiment of this application further provides a storage medium. The storage medium is applied to a server and stores program code, the program code, when run by a processor of the server, performing the following operations:

obtaining a first parsed image and a first pose image based on an original image, the first parsed image being an image labeled with parts of an object in the original image, the first pose image being used for representing a pose of the object in the original image;

inputting the first parsed image, the first pose image, and a second pose image used for representing a target pose into a first image generation model, and determining, by the first image generation model, a first transformation parameter and adjusting the first parsed image based on the first transformation parameter to obtain a target parsed image, a pose of an object in the target parsed image being the target pose, the first transformation parameter being a transformation parameter for transforming from the first pose image to the second pose image;

combining the original image and the first parsed image to obtain a first combined image; combining the second pose image and the target parsed image to obtain a second combined image; and inputting the first combined image and the second combined image into a second image generation model, the second image generation model determining a second transformation parameter and adjusting the first combined image based on the second transformation parameter and the second combined image to obtain a target image, a pose of an object in the target image being the target pose, the second transformation parameter being a transformation parameter for transforming from the first parsed image to the target parsed image.

In one embodiment, the processor of the server may further perform the following operations:

inputting the first pose image and the second pose image into a first convolutional neural network to determine the first transformation parameter;

the first image generation model encoding the first parsed image to obtain a first encoded image, and encoding the first pose image to obtain a second encoded image;

transforming the first encoded image into a third encoded image based on the first transformation parameter;

performing residual processing on the second encoded image and the third encoded image to obtain a fourth encoded image; and [0235] decoding the fourth encoded image.

In one embodiment, the processor of the server may further perform the following operations:

generating a first grid map based on the first transformation parameter, coordinates of a vertex in the first grid map being used for indicating a position of the vertex in the first encoded image; and transforming a pixel in the first encoded image into a corresponding vertex in the first grid map according to the coordinates of the vertex in the first grid map to obtain the third encoded image.

In one embodiment, the processor of the server may further perform the following operations:

inputting the first parsed image and the target parsed image into a second convolutional neural network to determine the second transformation parameter;

the second image generation model encoding the first combined image to obtain a fifth encoded image, and encoding the second combined image to obtain a sixth encoded image;

transforming the fifth encoded image into a seventh encoded image based on the second transformation parameter;

performing residual processing on the sixth encoded image and the seventh encoded image to obtain an eighth encoded image; and decoding the eighth encoded image.

In one embodiment, the processor of the server may further perform the following operations:

generating a second grid map based on the second transformation parameter, coordinates of a vertex in the second grid map being used for indicating a corresponding position of the vertex in the fifth encoded image; and transforming a pixel in the fifth encoded image into a corresponding vertex in the second grid map according to the coordinates of the vertex in the second grid map to obtain the seventh encoded image.

In one embodiment, the processor of the server may further perform the following operations:

obtaining a first sample parsed image and a first sample pose image based on a first sample image, the first sample image being any sample image in a plurality of sample images, the first sample parsed image being an image labeled with parts of an object in the first sample image, the first sample pose image being used for representing a pose of the object in the first sample image;

obtaining a second sample parsed image and a second sample pose image based on a second sample image, the second sample image being an image including the same object as the first sample image, the second sample parsed image being an image labeled with parts of an object in the second sample image, the second sample pose image being used for representing a pose of the object in the second sample image;

inputting the first parsed image, the first sample pose image, and the second sample pose image into a first model that needs to be trained, and outputting, by the first model, a third sample parsed image; and performing consistency detection on the second sample parsed image and the third sample parsed image, and adjusting a first training parameter of the first model according to a detection result until the first image generation model is obtained.

In one embodiment, the processor of the server may further perform the following operations:

combining the first sample image and the first sample parsed image to obtain a first sample combined image; combining the third sample parsed image and the second sample pose image to obtain a second sample combined image;

inputting the first sample combined image and the second sample combined image into a second model that needs to be trained, and outputting, by the second model, a training result image; and performing consistency detection on the training result image and the second sample image, and adjusting a second training parameter of the second model according to a detection result until the second image generation model is obtained.

In one embodiment, the processor of the server may further perform the following operations:

adjusting a size of the training result image to obtain training result images of a plurality of sizes; and performing consistency detection on the training result images of a plurality of sizes and the second sample image separately.

An embodiment of this application further provides a storage medium. The storage medium is applied to a server and stores program code, the program code, when run by a processor of the server, performing the following operations:

obtaining a second parsed image and a third pose image based on a first human body image, the second parsed image being an image labeled with parts of a human body in the first human body image, the third pose image being used for representing a pose of the human body in the first human body image;

determining a third transformation parameter, and adjusting the second parsed image based on the third transformation parameter to obtain a third parsed image, a pose of a human body in the third parsed image being a target human pose, the third transformation parameter being a transformation parameter for transforming from the third pose image to a fourth pose image used for representing the target human pose;

combining the first human body image and the second parsed image to obtain a third combined image; combining the fourth pose image and the third parsed image to obtain a fourth combined image; and determining a fourth transformation parameter, and adjusting the third combined image based on the fourth transformation parameter and the fourth combined image to obtain a second human body image, a pose of a human body in the second human body image being the target human pose, the fourth transformation parameter being a transformation parameter for transforming from the second parsed image to the third parsed image.

The server may also include a wired or wireless network interface, a keyboard, an I/O interface, and other components to facilitate I/O. The server may also include other components to implement device functions. Details are not described herein again.

The term module, and other similar terms such as subunit, unit, submodule, etc., in this disclosure may refer to a software unit, a hardware unit, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each unit can be part of an overall module that includes the functionalities of the module.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A target image generation method, comprising:
   obtaining a first parsed image and a first pose image based on an original image, the first parsed image being an image labeled with parts of an object in the original image, the first pose image representing a pose of the object in the original image;
   inputting the first parsed image, the first pose image, and a second pose image representing a target pose into a first image generation model, and determining, by the first image generation model, a first transformation parameter and adjusting the first parsed image based on the first transformation parameter to obtain a target parsed image, a pose of the object in the target parsed image being the target pose, the first transformation parameter being a transformation parameter for transforming from the first pose image to the second pose image;
   combining the original image and the first parsed image to obtain a first combined image; combining the second pose image and the target parsed image to obtain a second combined image; and
   inputting the first combined image and the second combined image into a second image generation model, and determining, by the second image generation model, a second transformation parameter and adjusting the first combined image based on the second transformation parameter and the second combined image to obtain a target image, a pose of the object in the target image being the target pose, the second transformation parameter being a transformation parameter for transforming from the first parsed image to the target parsed image.

2. The method according to claim 1, wherein the determining, by the first image generation model, a first transformation parameter and adjusting the first parsed image based on the first transformation parameter comprises:
   inputting the first pose image and the second pose image into a first convolutional neural network to determine the first transformation parameter;
   encoding, by the first image generation model, the first parsed image to obtain a first encoded image, and encoding the first pose image to obtain a second encoded image;
   transforming the first encoded image into a third encoded image based on the first transformation parameter;
   performing residual processing on the second encoded image and the third encoded image to obtain a fourth encoded image; and
   decoding the fourth encoded image to obtain the target parsed image.

3. The method according to claim 2, wherein the transforming the first encoded image into a third encoded image based on the first transformation parameter comprises:
   generating a first grid map based on the first transformation parameter, coordinates of a vertex in the first grid map indicating a position of the vertex in the first encoded image; and
   transforming a pixel in the first encoded image into a corresponding vertex in the first grid map according to the coordinates of the vertex in the first grid map to obtain the third encoded image.

4. The method according to claim 1, wherein the determining, by the second image generation model, a second transformation parameter and adjusting the first combined image based on the second transformation parameter comprises:
   inputting the first parsed image and the target parsed image into a second convolutional neural network to determine the second transformation parameter;
   encoding, by the second image generation model, the first combined image to obtain a fifth encoded image, and encoding the second combined image to obtain a sixth encoded image;
   transforming the fifth encoded image into a seventh encoded image based on the second transformation parameter;
   performing residual processing on the sixth encoded image and the seventh encoded image to obtain an eighth encoded image; and
   decoding the eighth encoded image to obtain the target image.

5. The method according to claim 4, wherein the transforming the fifth encoded image into a seventh encoded image based on the second transformation parameter comprises:
   generating a second grid map based on the second transformation parameter, coordinates of a vertex in the second grid map indicating a corresponding position of the vertex in the fifth encoded image; and
   transforming a pixel in the fifth encoded image into a corresponding vertex in the second grid map according to the coordinates of the vertex in the second grid map to obtain the seventh encoded image.

6. The method according to claim 1, further comprising training the first image generation model by:
   obtaining a first sample parsed image and a first sample pose image based on a first sample image, the first sample image being a sample image in a plurality of sample images, the first sample parsed image being an image labeled with parts of an object in the first sample image, the first sample pose image representing a pose of the object in the first sample image;
   obtaining a second sample parsed image and a second sample pose image based on a second sample image, the second sample image being an image comprising the same object as the first sample image, the second sample parsed image being an image labeled with parts of an object in the second sample image, the second sample pose image representing a pose of the object in the second sample image;

inputting the first parsed image, the first sample pose image, and the second sample pose image into a first model that needs to be trained, and outputting, by the first model, a third sample parsed image; and performing consistency detection on the second sample parsed image and the third sample parsed image, and adjusting a first training parameter of the first model according to a detection result until the first image generation model is obtained.

7. The method according to claim 6, further comprising training the second image generation model by:

combining the first sample image and the first sample parsed image to obtain a first sample combined image; combining the third sample parsed image and the second sample pose image to obtain a second sample combined image;

inputting the first sample combined image and the second sample combined image into a second model, and outputting, by the second model, a training result image; and performing consistency detection on the training result image and the second sample image, and adjusting a second training parameter of the second model according to a detection result until the second image generation model is obtained.

8. The method according to claim 7, wherein performing consistency detection on the training result image and the second sample image comprises:

adjusting a size of the training result image to obtain training result images of a plurality of sizes; and performing consistency detection on the training result images of a plurality of sizes and the second sample image separately.

9. A server, comprising a processor and a memory, the memory being configured to store program code, and the processor being configured to run the program code in the memory to perform the following operations:

obtaining a first parsed image and a first pose image based on an original image, the first parsed image being an image labeled with parts of an object in the original image, the first pose image representing a pose of the object in the original image;

inputting the first parsed image, the first pose image, and a second pose image representing a target pose into a first image generation model, and determining, by the first image generation model, a first transformation parameter and adjusting the first parsed image based on the first transformation parameter to obtain a target parsed image, a pose of an object in the target parsed image being the target pose, the first transformation parameter being a transformation parameter for transforming from the first pose image to the second pose image;

combining the original image and the first parsed image to obtain a first combined image; combining the second pose image and the target parsed image to obtain a second combined image; and inputting the first combined image and the second combined image into a second image generation model, and determining, by the second image generation model, a second transformation parameter and adjusting the first combined image based on the second transformation parameter and the second combined image to obtain a target image, a pose of an object in the target image being the target pose, the second transformation parameter being a transformation parameter for transforming from the first parsed image to the target parsed image.

10. The server according to claim 9, wherein the processor is configured to perform:

inputting the first pose image and the second pose image into a first convolutional neural network to determine the first transformation parameter;

encoding, by the first image generation model, the first parsed image to obtain a first encoded image, and encoding the first pose image to obtain a second encoded image;

transforming the first encoded image into a third encoded image based on the first transformation parameter;

performing residual processing on the second encoded image and the third encoded image to obtain a fourth encoded image; and decoding the fourth encoded image to obtain the target parsed image.

11. The server according to claim 10, wherein the processor is further configured to perform:

generating a first grid map based on the first transformation parameter, coordinates of a vertex in the first grid map indicating a position of the vertex in the first encoded image; and transforming a pixel in the first encoded image into a corresponding vertex in the first grid map according to the coordinates of the vertex in the first grid map to obtain the third encoded image.

12. The server according to claim 9, wherein the processor is further configured to perform:

inputting the first parsed image and the target parsed image into a second convolutional neural network to determine the second transformation parameter;

encoding, by the second image generation model, the first combined image to obtain a fifth encoded image, and encoding the second combined image to obtain a sixth encoded image;

transforming the fifth encoded image into a seventh encoded image based on the second transformation parameter;

performing residual processing on the sixth encoded image and the seventh encoded image to obtain an eighth encoded image; and decoding the eighth encoded image to obtain the target image.

13. The server according to claim 12, wherein the processor is further configured to perform:

generating a second grid map based on the second transformation parameter, coordinates of a vertex in the second grid map indicating a corresponding position of the vertex in the fifth encoded image; and transforming a pixel in the fifth encoded image into a corresponding vertex in the second grid map according to the coordinates of the vertex in the second grid map to obtain the seventh encoded image.

14. The server according to claim 9, wherein the processor is further configured to perform:

obtaining a first sample parsed image and a first sample pose image based on a first sample image, the first sample image being a sample image in a plurality of sample images, the first sample parsed image being an image labeled with parts of an object in the first sample image, the first sample pose image representing a pose of the object in the first sample image;

obtaining a second sample parsed image and a second sample pose image based on a second sample image, the second sample image being an image comprising the same object as the first sample image, the second sample parsed image being an image labeled with parts of an object in the second sample image, the second sample pose image representing a pose of the object in the second sample image;

inputting the first parsed image, the first sample pose image, and the second sample pose image into a first model, and outputting, by the first model, a third sample parsed image; and performing consistency detection on the second sample parsed image and the third sample parsed image, and adjusting a first training parameter of the first model according to a detection result until the first image generation model is obtained.

15. The server according to claim 14, wherein the processor is further configured to perform:

combining the first sample image and the first sample parsed image to obtain a first sample combined image; combining the third sample parsed image and the second sample pose image to obtain a second sample combined image;

inputting the first sample combined image and the second sample combined image into a second model, and outputting, by the second model, a training result image; and performing consistency detection on the training result image and the second sample image, and adjusting a second training parameter of the second model according to a detection result until the second image generation model is obtained.

16. The server according to claim 15, wherein the processor is further configured to perform the following operations:

adjusting a size of the training result image to obtain training result images of a plurality of sizes; and performing consistency detection on the training result images of a plurality of sizes and the second sample image separately.

17. A non-transitory storage medium, storing program code, the program code, when loaded by a processor, causing the processor to perform:

obtaining a first parsed image and a first pose image based on an original image, the first parsed image being an image labeled with parts of an object in the original image, the first pose image representing a pose of the object in the original image;

inputting the first parsed image, the first pose image, and a second pose image representing a target pose into a first image generation model, and determining, by the first image generation model, a first transformation parameter and adjusting the first parsed image based on the first transformation parameter to obtain a target parsed image, a pose of the object in the target parsed image being the target pose, the first transformation parameter being a transformation parameter for transforming from the first pose image to the second pose image;

combining the original image and the first parsed image to obtain a first combined image; combining the second pose image and the target parsed image to obtain a second combined image; and inputting the first combined image and the second combined image into a second image generation model, and determining, by the second image generation model, a second transformation parameter and adjusting the first combined image based on the second transformation parameter and the second combined image to obtain a target image, a pose of the object in the target image being the target pose, the second transformation parameter being a transformation parameter for transforming from the first parsed image to the target parsed image.

18. The non-transitory storage medium according to claim 17, wherein the determining, by the first image generation model, a first transformation parameter and adjusting the first parsed image based on the first transformation parameter comprises:

inputting the first pose image and the second pose image into a first convolutional neural network to determine the first transformation parameter;

encoding, by the first image generation model, the first parsed image to obtain a first encoded image, and encoding the first pose image to obtain a second encoded image;

transforming the first encoded image into a third encoded image based on the first transformation parameter;

performing residual processing on the second encoded image and the third encoded image to obtain a fourth encoded image; and decoding the fourth encoded image to obtain the target parsed image.

19. The non-transitory storage medium according to claim 18, wherein the transforming the first encoded image into a third encoded image based on the first transformation parameter comprises:

generating a first grid map based on the first transformation parameter, coordinates of a vertex in the first grid map indicating a position of the vertex in the first encoded image; and transforming a pixel in the first encoded image into a corresponding vertex in the first grid map according to the coordinates of the vertex in the first grid map to obtain the third encoded image.

20. The non-transitory storage medium according to claim 19, wherein the determining, by the second image generation model, a second transformation parameter and adjusting the first combined image based on the second transformation parameter comprises:

inputting the first parsed image and the target parsed image into a second convolutional neural network to determine the second transformation parameter;

encoding, by the second image generation model, the first combined image to obtain a fifth encoded image, and encoding the second combined image to obtain a sixth encoded image;

transforming the fifth encoded image into a seventh encoded image based on the second transformation parameter;

performing residual processing on the sixth encoded image and the seventh encoded image to obtain an eighth encoded image; and decoding the eighth encoded image to obtain the target image.

* * * * *